(12) United States Patent
Takeda et al.

(10) Patent No.: US 6,270,552 B1
(45) Date of Patent: Aug. 7, 2001

(54) ROTARY HEARTH FURNACE FOR REDUCING OXIDES, AND METHOD OF OPERATING THE FURNACE

(75) Inventors: Kanji Takeda; Yoshitaka Sawa; Tetsuya Yamamoto; Tetsuya Kikui, all of Chiba (JP)

(73) Assignee: Kawasaki Steel Corporation (JP)

( * ) Notice: Subject to any disclaimer, the term of this patent is extended or adjusted under 35 U.S.C. 154(b) by 0 days.

(21) Appl. No.: 09/308,869

(22) PCT Filed: Mar. 27, 1998

(86) PCT No.: PCT/JP98/01399

§ 371 Date: May 26, 1999

§ 102(e) Date: May 26, 1999

(87) PCT Pub. No.: WO99/16913

PCT Pub. Date: Apr. 8, 1999

(30) Foreign Application Priority Data

| Sep. 30, 1997 | (JP) | 9-265406 |
| Sep. 30, 1997 | (JP) | 9-265410 |
| Sep. 30, 1997 | (JP) | 9-265411 |

(51) Int. Cl.[7] ................................. C21B 11/00

(52) U.S. Cl. ............................. 75/485; 266/178
(58) Field of Search ............................. 75/436, 484, 485, 75/503; 266/200, 44, 168, 178

(56) References Cited

U.S. PATENT DOCUMENTS

| 3,443,931 | * | 5/1969 | Beggs et al. ............ 266/200 |
| 5,186,741 | * | 2/1993 | Kotraba et al. ............ 75/484 |
| 5,637,133 | * | 6/1997 | Munnix et al. ............ 75/484 |
| 5,730,775 | * | 3/1998 | Meissner et al. ............ 75/436 |

* cited by examiner

*Primary Examiner*—Scott Kastler
(74) *Attorney, Agent, or Firm*—Schnader Harrison Segal & Lewis LLP

(57) ABSTRACT

Traveling hearth furnace and an operating method thereof, which, when stacking a layer consisting of a mixture of oxides such as fine iron ore and a fine solid reducing material onto a horizontally traveling hearth and reducing the oxides through radiant heat transfer from above the hearth, is based on melting the reduction product in the course of up to a discharge port, and causing aggregation and separation of slag in from the reduction product, followed by solidifying the reducible material.

13 Claims, 19 Drawing Sheets

(a)

(b)

(a)

(b)

(a)

(b)

(c)

ROTARY HEARTH FURNACE FOR REDUCING OXIDES, AND METHOD OF OPERATING THE FURNACE

INDUSTRIAL FIELD OF THE INVENTION

The present invention relates to a method and an apparatus for operating a traveling hearth furnace suitable for the manufacture of reduced iron from iron ore.

DESCRIPTION OF THE RELATED ART

Production processes of crude steel are broadly classified into the blast furnace-converter process and the electric furnace process. An electric furnace manufactures steel from scrap or reduced iron as an iron raw material, by heating and melting the raw material by electric energy, and refining the same as required. Scrap is a main raw material at present. Because of the recent supply shortage of scrap and the tendency toward manufacturing high-grade products by the electric furnace process, however, there is an increasing consumption of reduced iron.

As one of the processes for manufacturing reduced iron, for example, Japanese Unexamined Patent Publication No. S63-108,188 discloses stacking a layer of an iron ore and a solid reducing material onto a hearth rotating in the horizontal direction, and heating the layer from above by radiant heat transfer to reduce the iron ore, thereby manufacturing reduced iron. This method provides advantages of a relatively low construction cost of facilities and a relatively low risk of operational troubles. In many cases, a form of rotary hearth as shown in FIG. 1 and FIG. 2 of the drawings is adopted as the hearth. A layer (t) of a mixed powder comprising an iron ore (oxide powder mainly comprising a fine iron ore) and a solid reducing material transported via a charger (a) is stacked onto the rotary hearth 1. The hearth 1 is covered with a furnace body 2 lined with refractory and a burner 3 (FIG. 2) serving as a heat source is provided on the upper portion of the inside thereof so as to reduce the iron ore on the traveling hearth 1. A furnace temperature of about 1,300° C. is usually used. To prevent oxidation after discharge of the product outside the furnace upon completion of reduction, and to achieve a high handling convenience, it is the usual practice to cool the reduced iron by use of a cooler on the rotary hearth, and then discharge the same for recovery.

In this conventional manufacturing method, gangue and ash contained in the raw material ore and the carbonaceous materials remain in the reduced iron product, and are melted and reduced in an electric furnace (melting furnace) forming the next step. Gangue and ash contained in the feed stock ore or coal entrapped into the electric furnace, have caused the following problems.

In order to reduce sulfur contained in the hot metal, it is necessary to raise the $CaO/SiO_2$ ratio in the produced slag. It is thus necessary to supply a CaO source in a large quantity in the form of limestone and dolomite according as the $SiO_2$ content resulting from gangue and ash increases.

Addition of much limestone and dolomite requires compensation for decomposition heat and sensible heat. For this purpose, an increase in the electric power consumption of the electric furnace is inevitable, hence requiring use of an extra-fine powdery ore having a low gangue content and concentrated and a low-ash coal so as to minimize the quantity of slag entering the electric furnace.

As described above, iron and steel-making via an electric furnace, require high-grade ore and coal suitable for a traveling hearth furnace, causing an increase in lost. In addition, the amount of deposits of resources and the production capacity thereof have already reached limits. Under these circumstances, therefore, the demand is increasing for supplying iron sources suitable for an electric furnace on the basis of ordinary ore and ordinary coal existing in large quantities.

It is easily conceivable that it is possible to maintain a reduced iron containing gangue and ash at high temperatures, bring the same in a molten state, and remove slag therefrom, but these cannot be achieved by the conventional method because of the following restrictions:

Separation of slag and metal is achievable by keeping metal and slag at high temperatures until complete melting in a both-type melting furnace such as a melting reducing furnace, but this is difficult in a traveling hearth furnace because of restrictions in facilities. The lowest temperature, the holding time and other operating conditions for separating slag and metal in a radiant heating furnace such as a traveling hearth furnace and melting behavior for determining these conditions have not as yet been clarified.

In order to increase the temperature of a radiant furnace, it is necessary to generate a high-temperature combustion flame. Increasing the temperature of the combustion flame requires preheating combustion air and to accomplish combustion near the theoretical air ratio. For the prevention of reoxidation of the reduced iron, on the other hand, it is necessary to maintain a very strong reducing gas atmosphere. Under this gas condition, however, it is difficult to obtain a high-temperature combustion flame.

When melting the raw material in a traveling hearth furnace, a thin molten iron layer and a slag layer separated from each other, are present on the traveling hearth. Problems of erosion of the traveling hearth caused by molten slag containing FeO, and adhesion of slag to the hearth, are encountered.

In this respect, U.S. Pat. No. 3,443,931 discloses a technique of achieving a semi-molten state by adjusting the atmosphere to a maximum temperature within a range of from 1,260 to 1,426° C., and to contain at least 10% combustible gas on a traveling hearth. While the disclosed technique permits maintenance of satisfactory contraction and oxidation resistance, separation of the gangue is difficult.

Removal of gangue and ash by melting outside the furnace is naturally conceivable, but it is needless to mention that this requires facilities such as a new cupola.

SUMMARY OF THE INVENTION

The present invention solves the problems in the conventional technique.

The invention provides a method of operating a traveling hearth furnace, comprising stacking a layer comprising a mixture of fine iron ore and a fine solid reducing material onto a hearth traveling horizontally on a course, and subjecting the layer to reduction of oxides via radiant heat transfer from the upper portion of the hearth, melting the reduction product on the course to a discharge port at a temperature over 1,450° C., and separating slag from the reduction product through aggregation. In the present invention, the oxygen partial pressure of a gaseous phase in contact with the reduction product is adjusted to a reducing atmosphere, and a layer different from the mixture layer may be stacked on the mixture layer.

In the invention, when stacking a mixture layer comprising a fine iron ore and a fine solid reducing material onto a hearth traveling horizontally, and reducing the fine ore by radiant heat transfer from above the hearth, first a fine coal char is stacked prior to stacking the mixture layer onto the hearth, then melting the product resulting from reduction of the mixture on the hearth at least once, and a carbonized gas is produced upon manufacturing a fine coal char by a preliminary carbonization of the coal as a heating fuel of the traveling hearth furnace.

In the operating method of a traveling hearth furnace of the invention for stacking feed stock mainly consisting of a fine iron ore and a fine solid reducing material on a hearth traveling horizontally, the method comprises the steps of dividing a mixed powder of a fine iron ore and a fine solid reducing material or a mixed powder of fine iron ore, a fine additive and a fine solid reducing material into small blocks, dotting the hearth surface with these blocks via the fine solid reduction material so as to avoid direct contact of the blocks with the hearth, and melting the reduced iron on the hearth at least once.

BRIEF DESCRIPTION OF THE DRAWINGS

FIG. 17 ($b$) is a perspective view of FIG. 17($a$);

FIG. 18($b$) is a vertical sectional view of a molten state after reduction;

FIG. 19($b$) is a vertical sectional view of FIG. 19($a$); and

FIG. 19($c$) is a descriptive view of melting of a reduced iron;

FIG. 21($b$) is a perspective view of FIG. 21($a$), (condition 1: example of the invention);

FIG. 22($b$) is a perspective view of FIG. 22($a$), (condition 2: example of the invention);

FIG. 23($b$) is a perspective view of FIG. 23($a$), (condition 3: comparative example);

FIG. 24($b$) is a perspective view of FIG. 24($a$), (condition 4: comparative example);

FIG. 25($b$) is a perspective view of FIG. 25($a$)

REFERENCE NUMERALS

Figure 1:
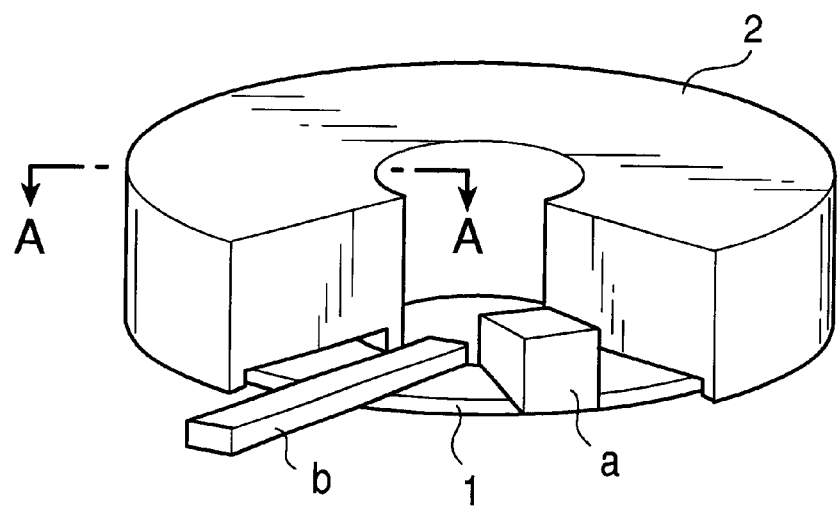
FIG. 1 illustrates a configuration of a rotary hearth furnace.

1: Hearth
2: Furnace body
3: Heating burner
4: Partition
5: Furnace body
6: Carbonaceous material layer
7: Mixture layer of iron ore (oxide) and solid reducing material
8: Combustion burner
9: Heater
9$a$: Burner
9$b$: Heat exchanger
10: Discharge apparatus
11: Gas supply nozzle
12: Slag
13: Cooler
14: Discharge apparatus used when stowing in FIG. 25
15: Discharge port
16: Hot metal
17: Fine coal char layer
18: Crusher
19: Fine coal charging port
20: Coal char discharging port
21: Screw feeder
22: Gas recovery port
23: Reduced iron separated from gangue and ash
t: Mixture layer (feed stock)
$t_1$: Carbonaceous material layer
a: Charges (stacking apparatus)
b: Discharging apparatus
c: Cutter
$c_1$: Arm
f: Molten layer $g_1$: Waste gas
$g_2$: Combustion air
h: Heater
i: Pyrrometer
n: Nozzle
$n_1$: Nozzle for waste gas
s: Bed

DESCRIPTION OF THE EMBODIMENTS

When a mixture of an oxide powder such as a fine iron ore and a fine solid reducing material is heated from outside, reactions expressed by the following formulae (1) and (2) continuously take place and reducing reactions proceed:

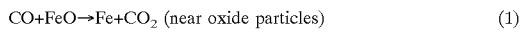
$$CO + FeO \rightarrow Fe + CO_2 \text{ (near oxide particles)} \quad (1)$$

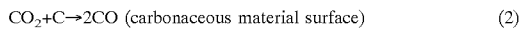
$$CO_2 + C \rightarrow 2CO \text{ (carbonaceous material surface)} \quad (2)$$

While the reducing reaction of the above formula (1) generally proceeds at a temperature of over 600° C., the reaction of the formula (2) proceeds only at a temperature higher than the reaction of the formula (1). In order to ensure continuous progress of the reaction, it is necessary to achieve smooth diffusion of $CO_2$ produced in the formula (1) to the solid reducing material particles and diffusion of CO produced in the formula (2) to the oxide particles.

In the case of ordinary iron ore and fine solid reducing material, the reactions can proceed by keeping the furnace temperature within a range of from 1,100 to 1,300° C. The reducing reactions of the formulae (1) and (2) basically proceed through reaction of solid iron oxides and the gas, and the resultant reduced iron is a porous solid metallic iron. The solid reducing material and the ash and the gangue contained in the fine iron ore are in a solidus phase and are mixed finely in the reduced iron. It is therefore difficult to separate ash and gangue by physical means such as crushing or screening.

The invention proposes aggregation and separation of slag and metal by melting the reduced product on the traveling hearth, and removal of slag by crushing and magnetic concentration after cooling. According to this method, therefore, it is possible to relatively efficiently obtain a reduced product even in an operation using an ore containing much gangue of an ordinary coal.

Figure 3:
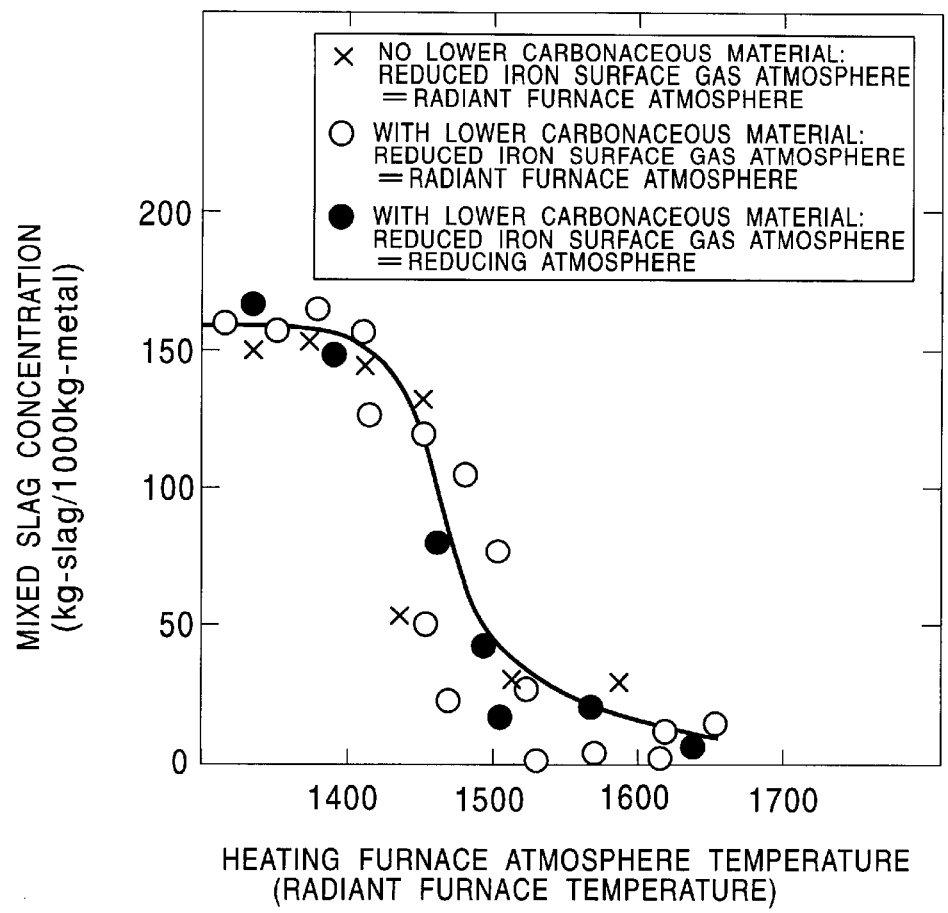
FIG. 3 is a graph illustrating the relationship between the mixed slag concentration mixed in the resultant metallic iron and the atmosphere temperature of the heating furnace.
Figure 4:
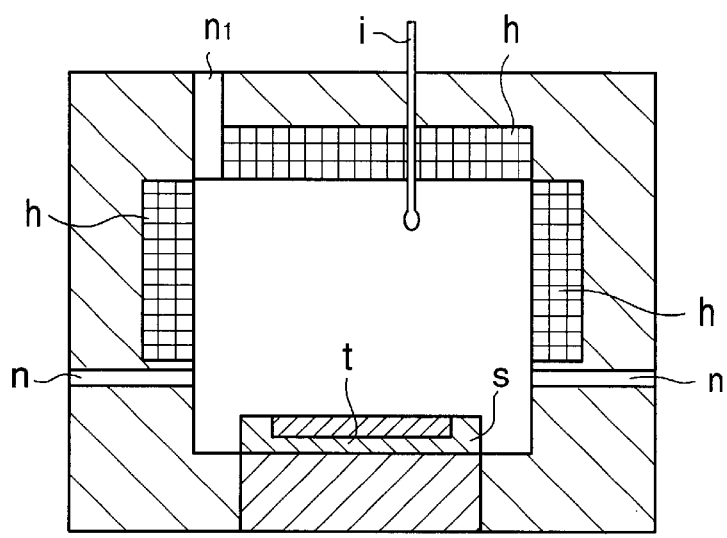
FIG. 4 illustrates a configuration of an electric furnace used in the experiment.

FIG. 3 illustrates the result of an experiment carried out in a small-capacity electric furnace having a structure as shown in FIG. 4 using an ore and a coal having compositions as shown in Table 1 (sample sectional area: 50×50 mm) to examine conditions necessary for aggregation and removal of slag and metal. In this experiment, a heating time of six minutes was adopted and the following three types of conditions were used: in the first case, a layer consisting of only carbonaceous materials was not provided under the mixture, and the gas atmosphere near the surface of the layer with an air ratio close to the theoretical air ratio; in the second case, a layer consisting of only carbonaceous materials was provided under the mixture, and the gas atmosphere near the surface of the layer with an air ratio close to the theoretical air ratio; and in the third case, a layer consisting of only a single kind of carbonaceous material was provided under the mixture, and the gas atmosphere near the surface of the layer was a reducing atmosphere. The quantity of carbonaceous materials added to the mixture was sufficient even to cope with the reduction and the subsequent carbonization reaction. The surface gas atmosphere was defined to have a ratio of the total reactive gas concentration relative to the reducing components in the gas:

$$\text{Reducing gas concentration} = (CO+H_2)/(CO+H_2+H_2O+CO_2) \times 100 \, [\%]$$

The composition near the theoretical air ratio was defined as a reducing gas concentration of about 3%, and the reducing atmosphere, a reducing gas concentration of 90%.

An electric heater h was provided on the upper surface of the electric furnace used in the experiment, and a mixture "t" of carbonaceous materials and a fine ore provided on the bed was heated by radiant heat. A nozzle n was provided at a position 10 mm above the sample surface to adjust the gas atmosphere on the sample surface, and an atmosphere adjusting gas was blown through this nozzle and discharged from $n_1$. The produced reduced iron and slag were crushed to less than 10 mm and magnetically concentrated. The slag removal temperature was evaluated from the mixed slag concentration contained in the resultant metallic iron.

Irrespective of the experimental conditions, as shown in FIG. 3, the mixed slag concentration can be rearranged as a function of temperature. The mixed slag concentration suddenly decreased upon passing the level of heating furnace atmosphere temperature of 1,450° C., and the separation of metal and slag was thus clarified. A 1,400° C. sample was subjected to a microscopic observation to investigate the cause of such rapid metal-slag separation, and the following features were observed:

Carburization is in progress into the metal. This results in a decreased melting point, and the ore fines do not keep the initial shape thereof since the metal is in a molten state. Because of a very large surface tension of the metal, many of the particles take a spherical shape.

The carbonaceous materials scatter over the observed surface, but are not considered to disturb aggregation of the metal.

Slag coming from the carbonaceous materials is partly melted, and a non-melted portion still exists.

Disturbance of aggregation among the molten metal particles is attributable to high-viscosity slag partly in a molten state derived from the ash of carbonaceous materials. At 1,500° C. observed for comparison purposes, melting, displacement and aggregation are in progress not only of the metal but also of the slag.

These results reveal that, while separation of iron slag should start by selecting a temperature that is higher by 100° C. than the melting point of carburized iron, 1,150° C. if only melting of the metal is in question, melting and displacement of slag form restricting conditions, and it is necessary to keep the heating furnace atmosphere temperature above 1,450° C. At this temperature of 1,450° C., $Al_2O_3$—$SiO_2$—CaO slag which is the main component of coal ash melts with a decreased viscosity, and begins aggregating and displacing.

Figure 5:
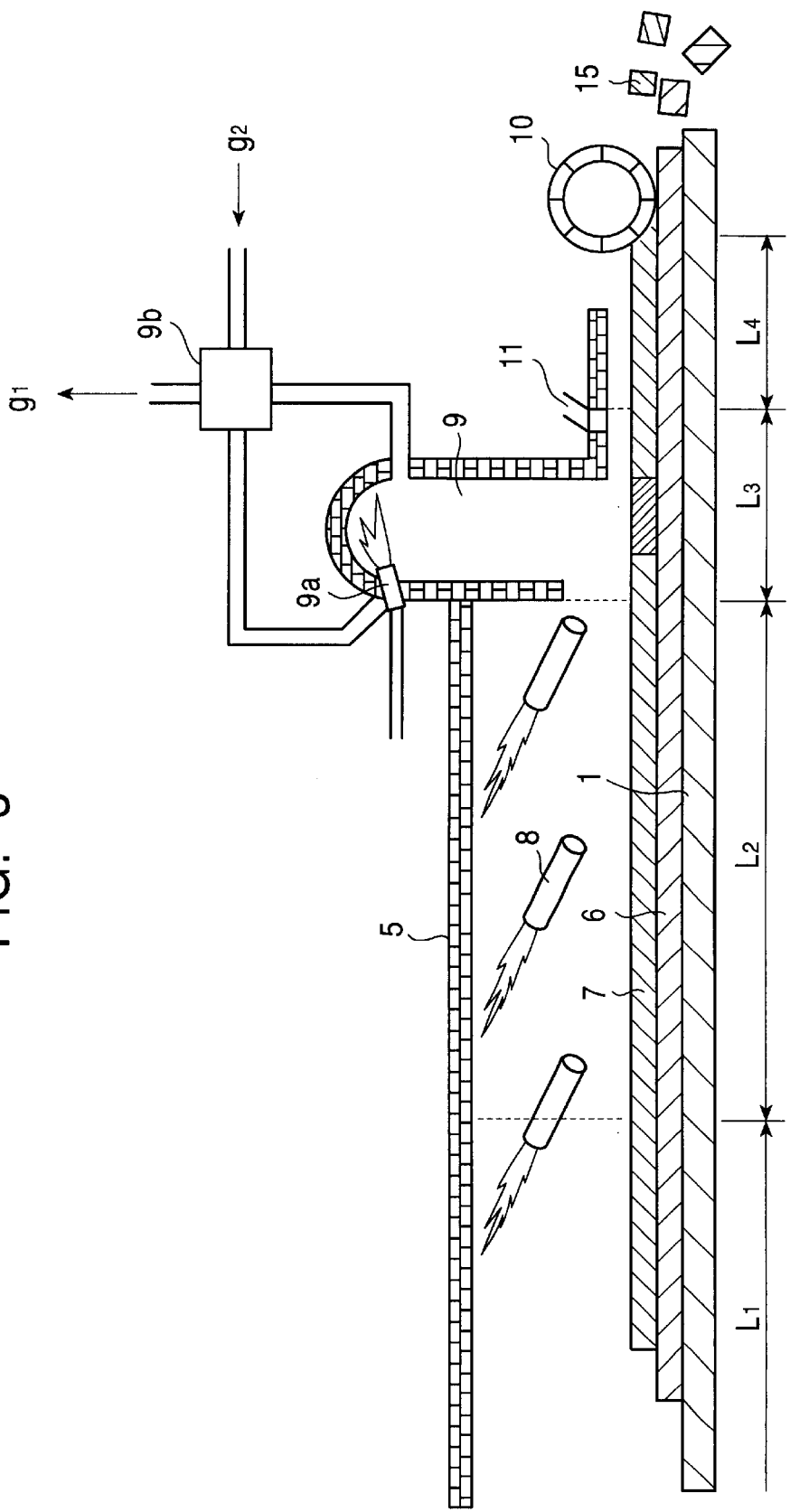
FIG. 5 illustrates a configuration of a furnace according to the invention.

The configuration of the traveling hearth furnace of the invention, permitting separation of slag and metal invented on the basis of the foregoing fundamental experiment, is illustrated in FIG. 5. In FIG. 5, 1 is a hearth; 5 is a furnace body; 6 is a carbonaceous material layer stacked on the hearth 1; 7 is a mixture layer stacked on the carbonaceous material layer 6; 8 is one or more combustion burners arranged above the hearth 1; and 9 is a heater positioned for melting the product resulting from reduction. This heater 9 comprises a burner 9a and a heat exchanger 9b for heating combustion air $g_2$ by means of the burner 9a and a waste gas $g_i$.

The traveling hearth furnace having the configuration described above comprises a preheating zone covering an area ranging from a charging port not shown to $L_1$, a reduction zone covering an area $L_2$ following the above, a melting zone covering an area $L_3$, and a cooling zone covering an area $L_4$. In the first two zones, heating is performed by burning the combustion burner with the reducing gas generated from the layer of the mixture of the fine ore and the carbonaceous materials as a main heat source. The mixture layer having reached a reduction rate of over 80% in the reduction zone $L_2$ is then heated at a temperature over 1,450° C. in the melting zone $L_3$, and slag is removed from the produced reduced iron layer. Then, after cooling and heat recovery in the cooling zone $L_4$, the reduced product is crushed in a collector 10 and discharged from the discharge port 15. Since the high-temperature melting zone of over 1,450° C. is formed in the present invention, the heating method for the melting zone $L_3$ is different from that for the other zones. Waste gas from the melting zone $L_3$ is heat-exchanged with combustion air through the high-temperature heat exchanger 9b.

By causing combustion of air preheated to about 900° C. and a separately supplied fuel at substantially the theoretical air ratio, a high-temperature melting zone of over 1,450° C. can be formed. For the purpose of independently controlling the gas atmosphere of the melting zone $L_3$ and the gas atmosphere of the reduced iron surface, a gas supply nozzle 11 should preferably be provided to supply an atmosphere of adjusting gas. By using a traveling hearth furnace having the configuration as described above, it is possible to manufacture a reduced iron product resulting from reduction of the mixed layer of the fine ore and the carbonaceous materials and removal of slag. In terms of production cost, a mixed layer of fine ore and carbonaceous materials formed by simply mixing these materials would have to the lowest cost. However, a layer of previously granulated or otherwise treated materials may be stacked and subjected to reduction and melting.

Apart from the mixed layer, in the invention, a layer of carbonaceous materials 6 may be deposited on the hearth 1 under the mixed layer 7. Provision of such a carbonaceous material layer brings about an advantage of preventing contact of the molten materials melting in the melting zone with the hearth. The size of the fine iron ore and the fine solid reducing agent should be under 10 mm, or preferably, under 8 mm, or more preferably, under 3 mm as screen mesh from the point of view of reducibility and reactivity with $CO_2$.

Figure 10:
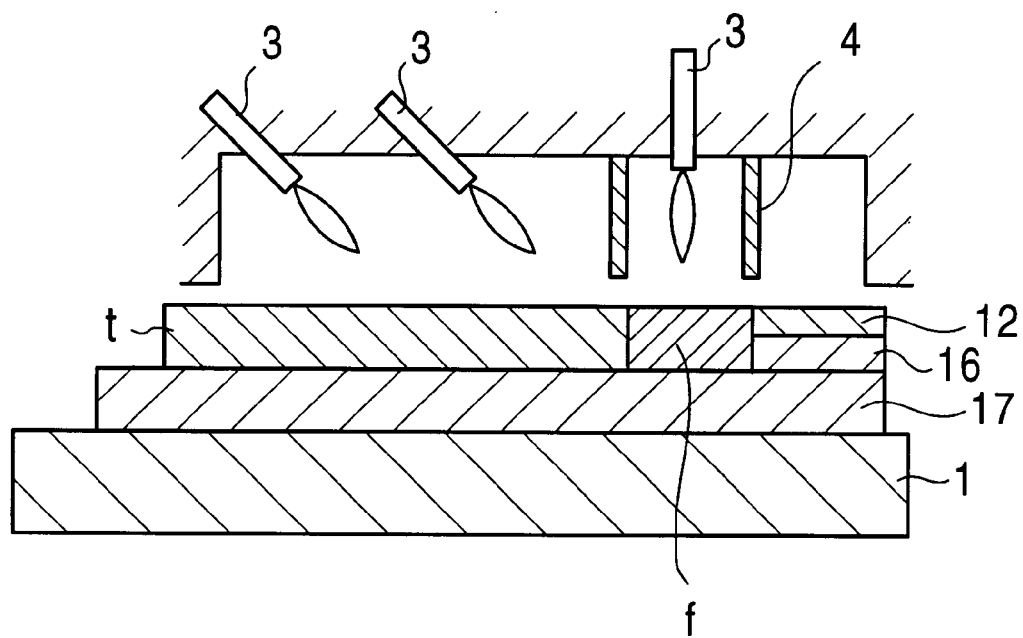
FIG. 10 is a descriptive view of the operating procedure according to the invention.

FIG. 10 is a sectional view of a part of a traveling hearth furnace (the furnace having the same fundamental structure as present invention.) In FIG. 10, 17 is a layer of a fine coal char for mounting a layer of a mixture t; 4 is a partition forming a melting zone in which the reduced product is melted, and held by a furnace body 2; and f is a molten layer melted in the melting zone.

When the layer 17 consisting only a single kind of the fine coal char is stacked on a rotary hearth 1, and a mixture layer t is stacked on this layer 17 for reduction, the layer t of the mixture (charged from a charger a of FIG. 1) is reduced during passage to a discharge apparatus b (FIG.1 ). Subsequently, the product (reduced iron) is melted in the melting zone, (formed by partition 4 of FIG. 10). Gangue and ash contained in this product are separated in the form of slag. By preliminarily carbonizing the coal used as the fine solid reducing material, a fine coal char is made. Because this coal char has been preliminarily carbonized, almost no decomposition reaction takes place upon heating, and the requried amount of-heat input is smaller than in case using a coal. It is therefore possible to achieve a temperature that permits reduction of iron ore on the hearth having a relatively short hearth length, and for the same hearth area, to improve productivity.

Figure 11:
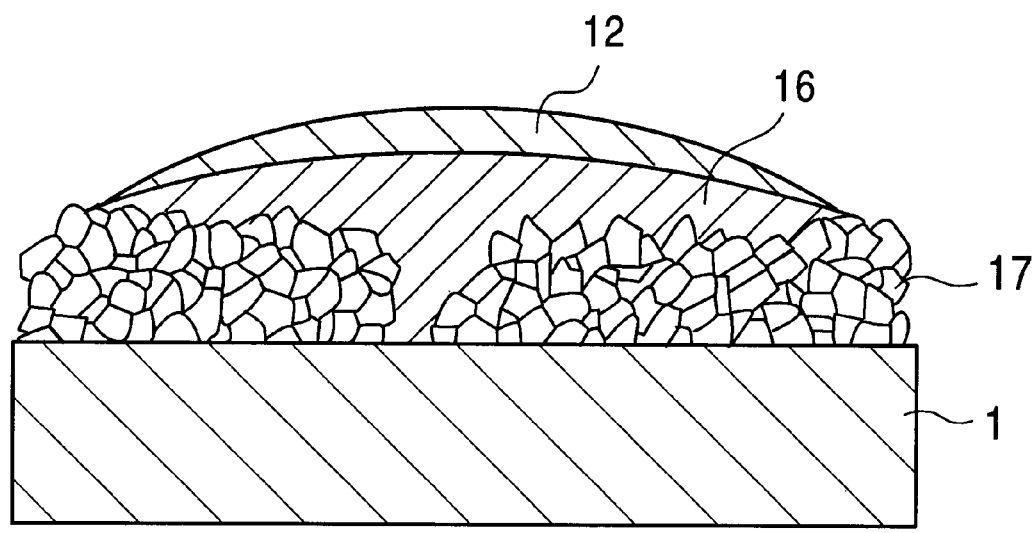
FIG. 11 illustrates a case using a material other than a coal char for stowing tacking under the mixture.

FIG. 11 illustrates a case using a fine solid reducing material as a coal containing much volatile material in place of the coal char layer. In this case, there occurs melting of the fine solid reducing material or a change in volume along with volatilization from the fine solid reducing agent caused by the increase in temperature, resulting in occurrence of cracks in the layer 17. Upon melting, therefore, the reduced iron 16 and slag 12 flow through these cracks onto the rotary hearth 1 and may erode the surface thereof (FIG. 11). When forming the layer 17 with a fine coal char, in contrast, the volatiles have already been lost through carbonization. Because the ash content is about 10%, it remains in the solid state even at a high temperature of over 1,000° C., and is never subject to melting or a change in volume, from the macroscopic point of view. No cracks therefore occur in the layer 17, and the molten iron 16 or slag 12 never erodes the rotary hearth 1 by contact therewith.

Figure 12:
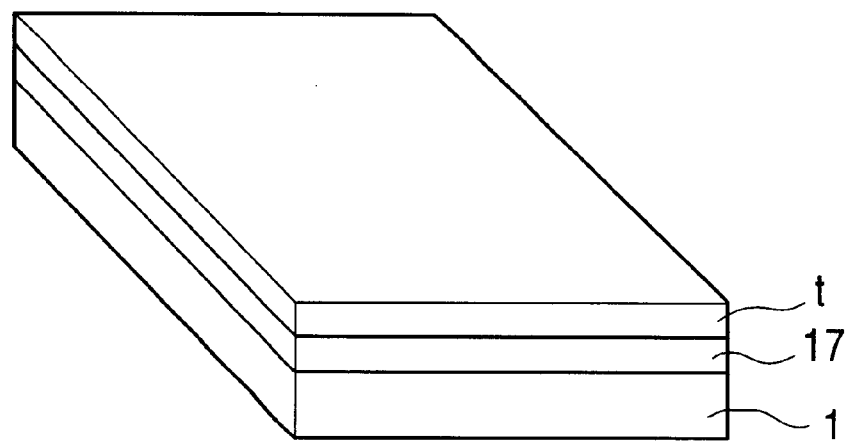
FIG. 12 illustrates the mixture and a coal char stacked on the hearth according to the invention.
Figure 13:
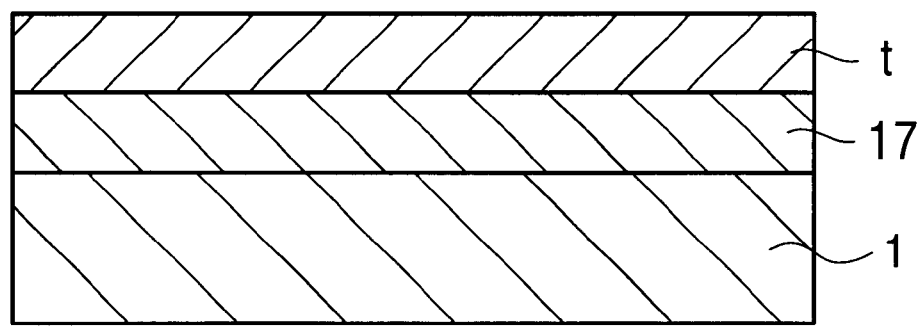
FIG. 13 is a sectional view of FIG. 12.
Figure 14:
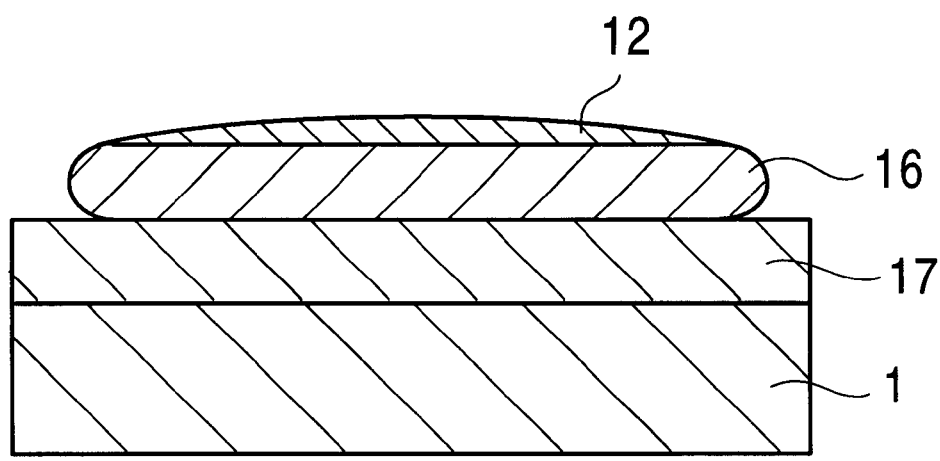
FIG. 14 is a sectional view of a case melting of FIG. 13.

FIG. 12 illustrates a case where a mixture of a fine iron ore and a fine coal char or a mixture of a fine iron ore, a fine coal char and fine additives is stacked on a layer consisting of a single kind of the fine char, and FIG. 13 illustrates a sectional view of FIG. 12. When heated by radiant heat transfer from above the hearth, the fine iron ore is reduced into a reduced iron containing gangue. From the fine coal char used as the reducing agent, ash remains. The fine additives are added, when causing reduced iron and ash to melt, for facilitating melting, and include limestone, fluorspar, serpentive, and dolomite. Although evaporation of crystallized water and partial decomposition reaction (for example, $CaCO_3$, the main component of limestone, is thermally decomposed into CaO) occur prior to melting, these additives maintain the solidus state. Upon heating further, these materials begin melting, together with gangue in the fine iron ore and ash in the coal char, and ore separated into hot metal and slag. At this point, since the mixed powder of the fine iron ore and the fine coal char or the mixed powder of the fine iron ore, the fine coal char and the fine additives is present on the layer comprising the fine coal char only, hot metal 16 and slag 12 are formed on the layer 17 consisting only of the fine coal char as shown in FIG. 14. The hot metal 16 and the molten slag 12 usually have a higher specific gravity than that of the layer 17 composed only of the fine coal char. However because the layer 17 of the fine coal char alone is dense, the hot metal 16 and the molten slag 12 are held on top of the fine coal char layer 17 and never cause damage to the hearth refractory. To achieve a denser fine coal char layer, it suffices to adjust the screen mesh size to under 10 mm, or preferably to under 3 mm.

When obtaining a reduced iron by heating a mixture of a fine iron ore and a fine coal char or a mixture of a fine iron ore, a fine coal char and fine additives reduction of the iron ore takes place directly from the reducing reaction. It is therefore necessary to supply heat required for the reaction from outside. However, since combustible CO gas is produced by the active reducing reaction during the initial stage of reaction, heat can be supplied by burning this CO gas.

When the reducing reaction proceeds and the latter period of reduction is reached, the quantity of produced CO gas decreases. It is necessary, therefore, to supply combustion or heat from outside. When causing the reduced iron to melt after reduction, there is a small quantity of produced CO gas because reduction has been almost completed. In order to cause further melting of the reduced iron, the melting temperature should be higher than the reduction temperature, and it is thus necessary to supply heat from outside. The combustible gas produced during the preliminary carbonization, having a large calorific value, can be used in the melting zone of the traveling hearth furnace in the present invention. By effectively utilizing this combustible gas produced upon preliminary carbonization, it is possible to reduce the furnace energy consumption. As means for preliminarily carbonizing a fine coal, a preliminary carbonizing apparatus is applicable. The particle size of the fine iron ore and the fine solid reducing material should be adjusted using a mesh size of under 10 mm, or preferably under 8 mm, or more preferably under 3 mm considering reducibility of ore and reactivity between the reducing agent and $CO_2$.

According to the invention, furthermore, it is possible to facilitate discharge of the product by optimizing the charging method of raw materials onto the traveling hearth. More specifically, small blocks formed by driving the mixed powder of the fine iron ore and the fine solid reducing material or the mixed powder of the fine iron ore, the fine solid reducing material and the fine additives are scattered in the layer of the fine solid reducing material. Then, the resultant mixture is layered on the horizontally traveling hearth so as not to be in direct contact with the hearth. After reduction, the reduced iron is melted.

Figure 19:
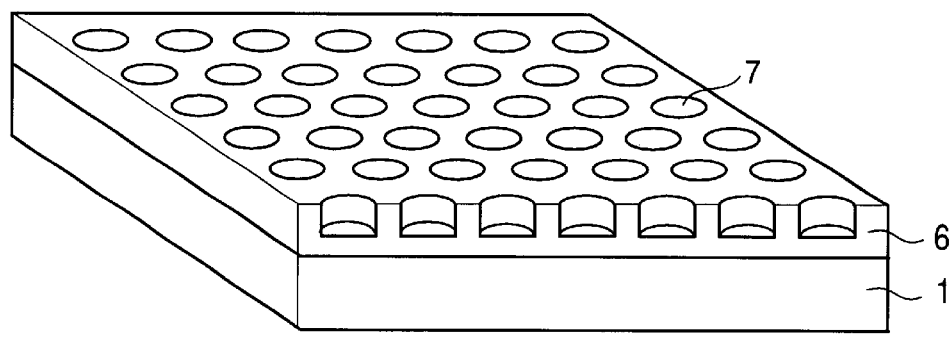
FIG. 19($a$) is a perspective view illustrating the state of feed stocks stacking onto the hearth according to the invention.
Figure 19:
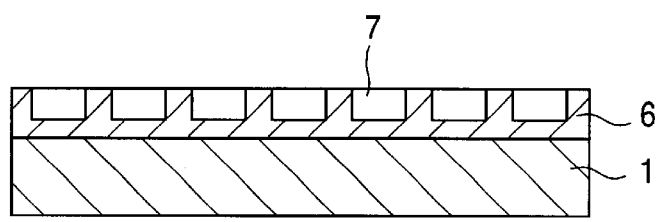
Figure 19:
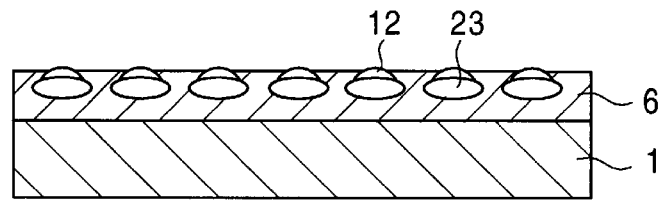

As an example, FIGS. 19(a), (b) and (c) are descriptive views illustrating feed stock layered on a hearth according to the invention, showing changes occurring upon melting the reduced iron. In FIG. 19, 7 is a mixed powder of a fine iron ore and a fine solid reducing material (or a fine iron ore, fine additives and a fine solid reducing material); 6 is a layer of a fine solid reducing material; 1 is a traveling hearth; 23 is a reduced iron after separation of gangue and ash; and 12 is a slag. When stacking the raw materials as shown in FIGS. 19(a) and 19(b), and heating the same from above by radiant heat transfer, the fine iron ore is reduced by the action of the fine solid reducing material into a reduced iron containing gangue. Ash remains from the fine solid reducing agent having served as the reducing material. The additives are added to facilitate melting when causing the reduced iron and ash to melt, including limestone, fluorspar, serpentine and dolomite. Although evaporation of crystallized water and partial decomposition reaction (for example, $CaCO_3$, the main component of limestone, is thermally decomposed into CaO) occur prior to melting, these additives maintain the solidus state. Upon heating further, these materials begin melting and are separated into hot metal and slag. At this point, since the mixed powder of fine iron ore and fine coal char or the mixed powder of fine iron ore, fine coal char and fine additives scatters throughout the layer comprising the fine coal char only, and is not in direct contact with the horizontally traveling hearth, the hot metal and the molten slag aggregate every scattered block, and reduced iron lumps are formed on the layer of the fine solid reducing agent alone. Because hot metal and molten slag have usually a specific gravity that is lower than that of the layer of the fine solid reducing material alone, it is conceivable that hot metal and molten slag might get under the layer of the fine solid reducing material alone. However, the layer of the fine solid reducing material alone is dotted with the mixed fines of the fine iron ore and the fine solid reducing material (or the mixed fine powder of the fine iron ore, the fine additives and the fine solid reducing material). Each block of hot metal or molten slag is therefore small in size and is held on the layer of the fine solid reducing material alone by the action of surface tension.

When the hot metal and the molten slag are cooled by a cooler on the traveling hearth in this state, the reduced iron and slag after separation of gangue and ash float on the layer of the fine solid reducing material alone, and form lumps for the individual scattered blocks. The reduced iron and slag, having solidified, are thus separated from the traveling hearth as a result of presence of the layer of fine solid reducing material alone, and the individual blocks are small lumps, thus permitting easy discharge from the furnace. The fine iron ore should preferably have a size of under 8 mm, the fine additives, under 8 mm, and the fine solid reducing material, under 8 mm.

It is also possible to use a pitch coke containing almost no ash as the fine solid reducing material in the mixed powder of the fine iron ore and the fine solid reducing material. In this case, there is no need of removal of ash in the present invention, with however the same separating effect of gangue in the ore. When using a coking coal for the layer of the fine solid reducing material alone, the coal melts into the coke at a temperature lower than the temperature at which hot metal and molten slag are formed. At a temperature at which hot metal and molten slag are formed, the coal is already in a solid state, and can exert the above effect. A mixture of one or more of coal char, coke, general coal and anthracite usually contains about 10% ash. These fine solid reducing materials can be favorably utilized in the present invention, and when using any of these materials as the fine solid reducing material, it may be of the same kind as, or a different kind from, the fine solid reducing material from the point of view of removing ash.

EXAMPLES

Example 1

Figure 2:
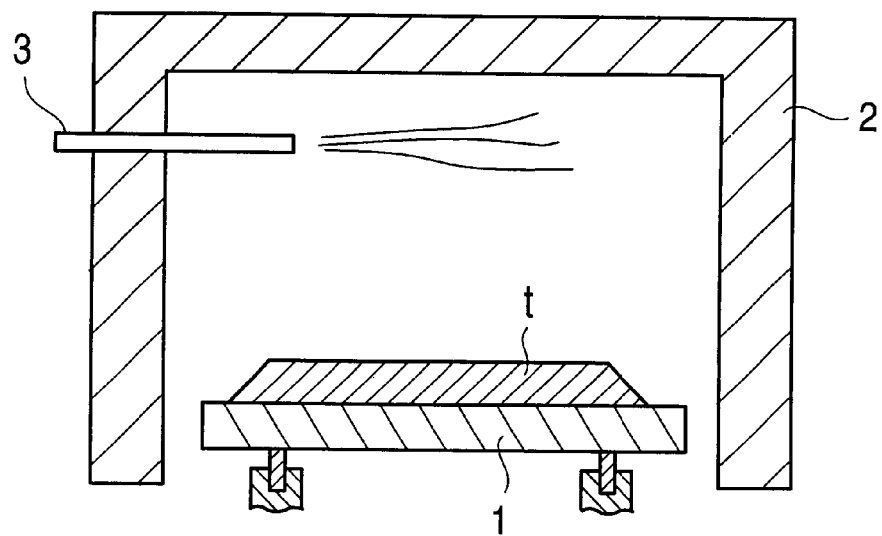
FIG. 2 is a sectional view of FIG. 1 cut along the line A—A.
Figure 6:
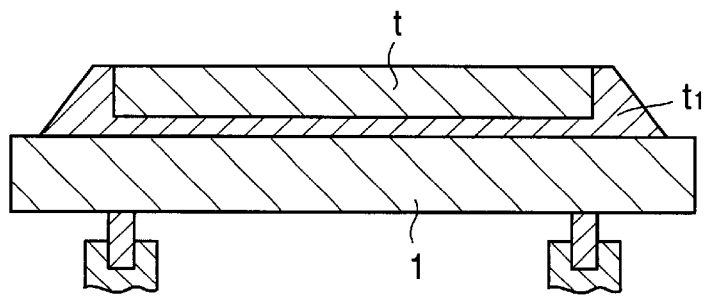
FIG. 6 is a sectional view of a layer of a mixture and a single kind of carbonaceous material stacked on a hearth.

Operation was carried out by the following procedure using a traveling hearth furnace (having the same configuration in detail as that shown in FIG. 5) as shown in FIGS. 1 and 2 provided with a rotary hearth lined with alumina refractory and having a diameter of 2.2 mm in which the refractory of the melting zone comprised a high-alumina high-refractory brick work, to investigate the effect of a change in temperature of the melting zone on the yield of the final product (reduced iron). A screw type discharging apparatus was arranged at the discharge port of the furnace, and a mixture t of a fine iron ore and a fine solid reducing material and a layer $t_1$ of a carbonaceous material alone were stacked at the charging port as shown in FIG. 6. The particle size of the fine iron ore and the fine solid reducing material was adjusted to a screen mesh of under 3 mm.

An iron ore and a carbonaceous material having compositions as shown in Table 1 were employed. The furnace temperature in the reducing zone was controlled to 1,300° C. through combustion control of the burner, with a standard staying time in the melting zone of six minutes. Three operational patterns were used: in a first pattern, a layer of a carbonaceous material alone was not provided under the mixture, with a surface gas atmosphere near the theoretical air ratio; in a second pattern, a layer of a carbonaceous material alone was provided under the mixture, with a surface gas atmosphere near the theoretical air ratio; and in a third pattern, a layer of a carbonaceous material alone was provided under the mixture, with a surface gas atmosphere being a reducing atmosphere.

Figure 7:
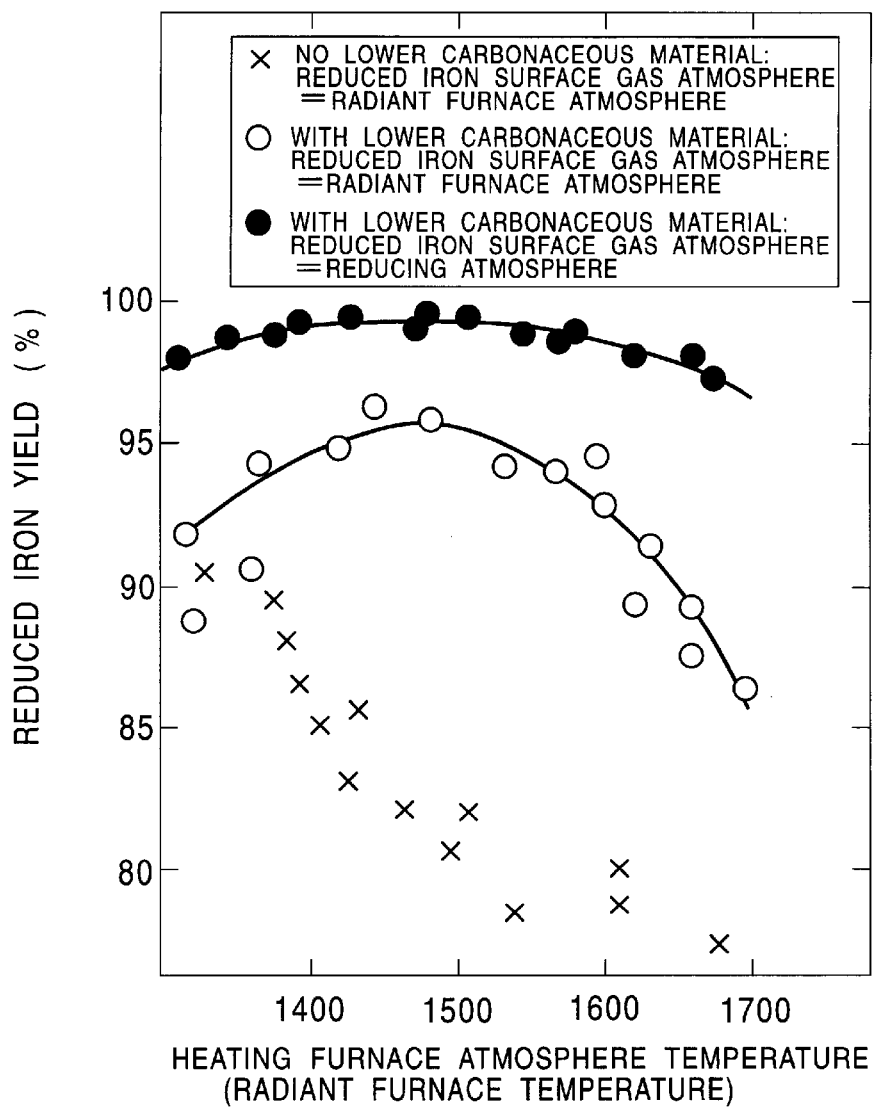
FIG. 7 illustrates the relationship between the reduced iron yield and the heating furnace atmosphere temperature.
Figure 8:
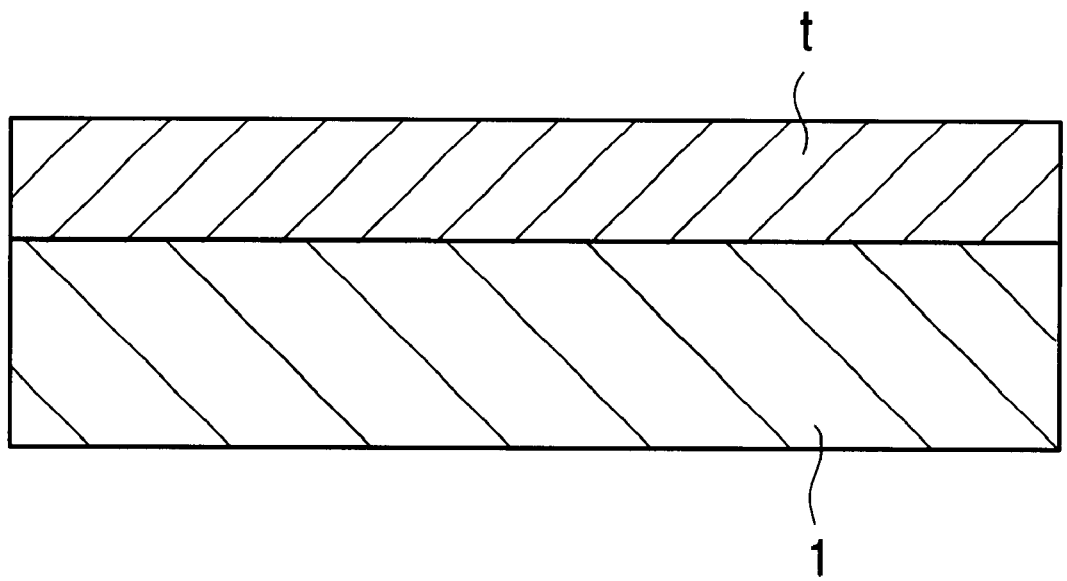
FIG. 8 illustrates a mixed powder of iron ore and a solid reducing material directly stacked on a traveling hearth.
Figure 9:
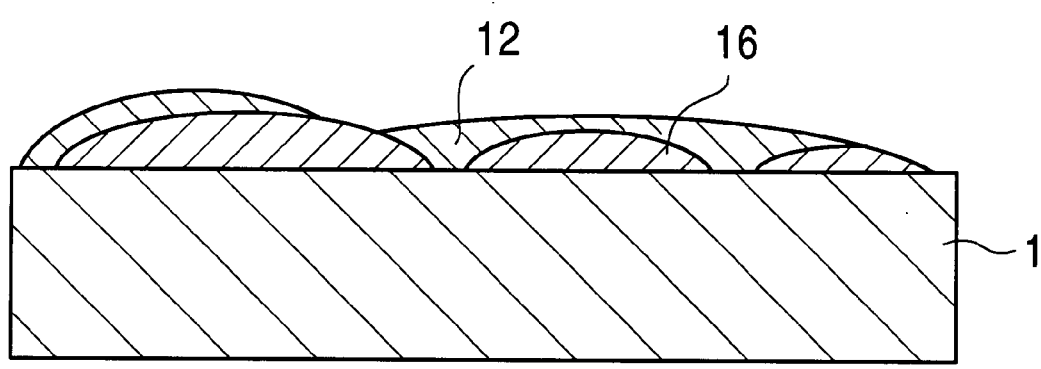
FIG. 9 illustrates reduced iron melted on a traveling hearth.

FIG. 7 illustrates the relationship between the melting zone temperature and the reduced iron yield under various conditions. At low temperatures under 1,450° C. at which melting did not occur, there was no change in the reduced iron yield irrespective of presence or absence of a lower carbonaceous material layer. In the absence of a carbonaceous material layer under the mixture, at a temperature over 1,450° C. at which melting occurs, the produced hot metal and slag melted and adhered to the traveling hearth surface, thus largely reducing the reduced iron yield. In a case where a carbonaceous material layer was provided under the mixture, on the other hand, pores of the porous reduced iron were clogged along with melting, thus inhibiting oxidation caused by the atmosphere gas, leading to an increase in reduced iron yield. With the increase in temperature, however, oxidation was caused by the combustion gas near the theoretical oxidative air ratio for iron, and the resultant FeO flowed out into slag, and as a result, the reduced iron yield largely decreased. When a reducing gas of a concentration of 90% was supplied through blowing of an atmosphere adjusting gas on the exit side of the melting zone with a reducing gas atmosphere on the surface of the reduced iron, it was confirmed that the prevention from reoxidation by the atmosphere gas resulted in a stable reduced iron yield of over 97% at low temperatures. It was therefore possible to confirm, from this result, that slag can be removed from the reduced iron at a melting zone temperature of over 1,450° C., that, for improving the reduced iron yield, it is necessary to provide a layer of carbonaceous material under the mixture, and that it is important to adjust the gas atmosphere on the reduced iron surface into a reducing atmosphere.

The experiment Nos. 1 to 3 in Table 2 show the results of operation (comparative example) carried out with a low melting zone temperature without a carbonaceous material layer under the mixture. In this example, although the metal recovery ratio was high, separation of slag, the main object of the invention, was insufficient. The experiment Nos. 4 to 7 represent examples for examining the effect of the melting zone temperature (examples of the invention), showing that the slag concentration largely decreased at temperatures of over 1,450° C. The experiment Nos. 8 and 9 are examples for examining the effect of the heating time (examples of the invention): a longer heating time leads to improved of slag separation. In the experiment No. 10, the atmosphere on the layer surface was a reducing atmosphere, resulting in a remarkable improvement of the reduced iron yield. The experiment Nos. 11 and 12 represent cases without carbonaceous material layer under the mixture: in spite of achievement of separation of slag, the main object of the invention, the reduced iron yield is slightly lower than that available under the optimum conditions. The experiment Nos. 13 to 16 show results obtained by changing the kind of the carbonaceous material into char and coke: results similar to those with coal were obtained.

Example 2

Figure 20:
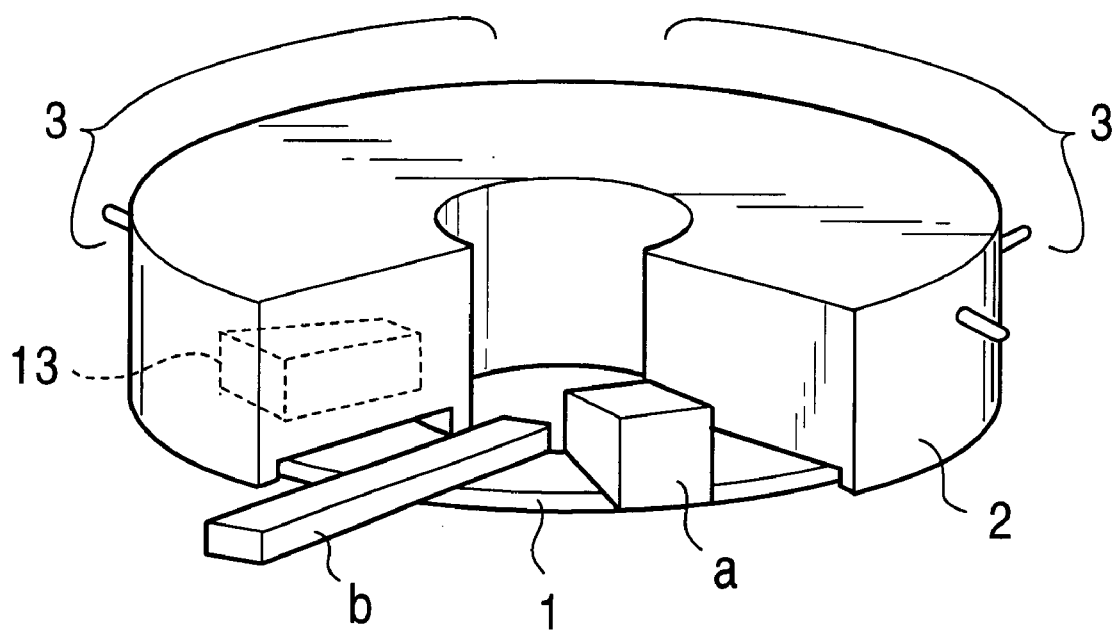
FIG. 20 is a descriptive view of a rotary hearth furnace used in an embodiment.
Figure 21:
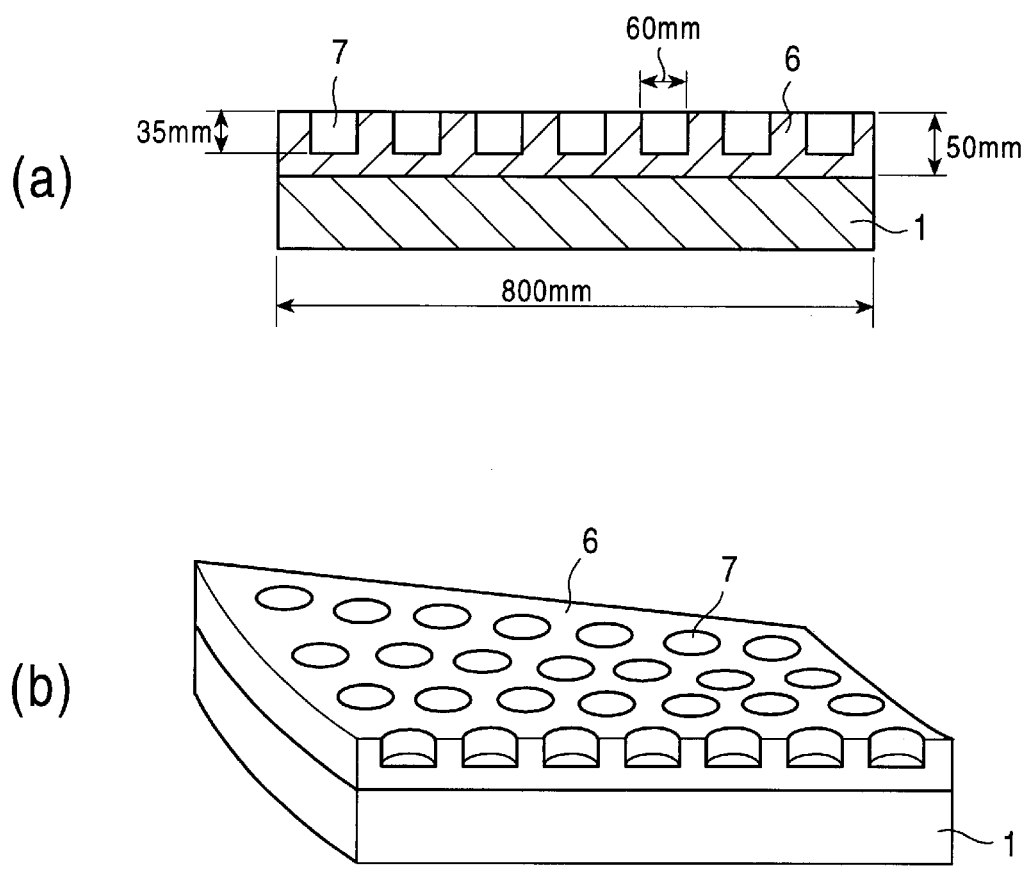
FIG. 21($a$) is a vertical sectional view illustrating the state of feed stock stacking adopted in an embodiment of the invention.
Figure 22:
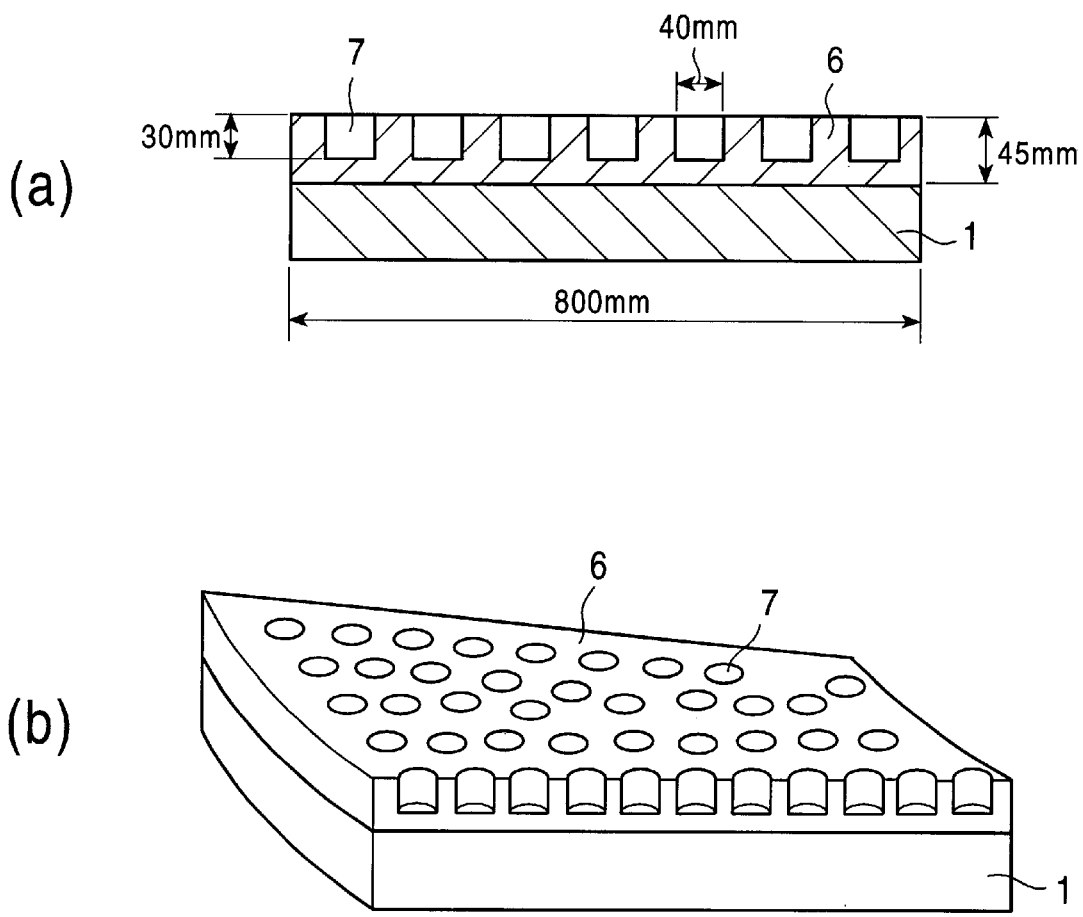
FIG. 22($a$) is a vertical sectional view illustrating the state of feed stock stacking adopted in an embodiment of the invention.
Figure 23:
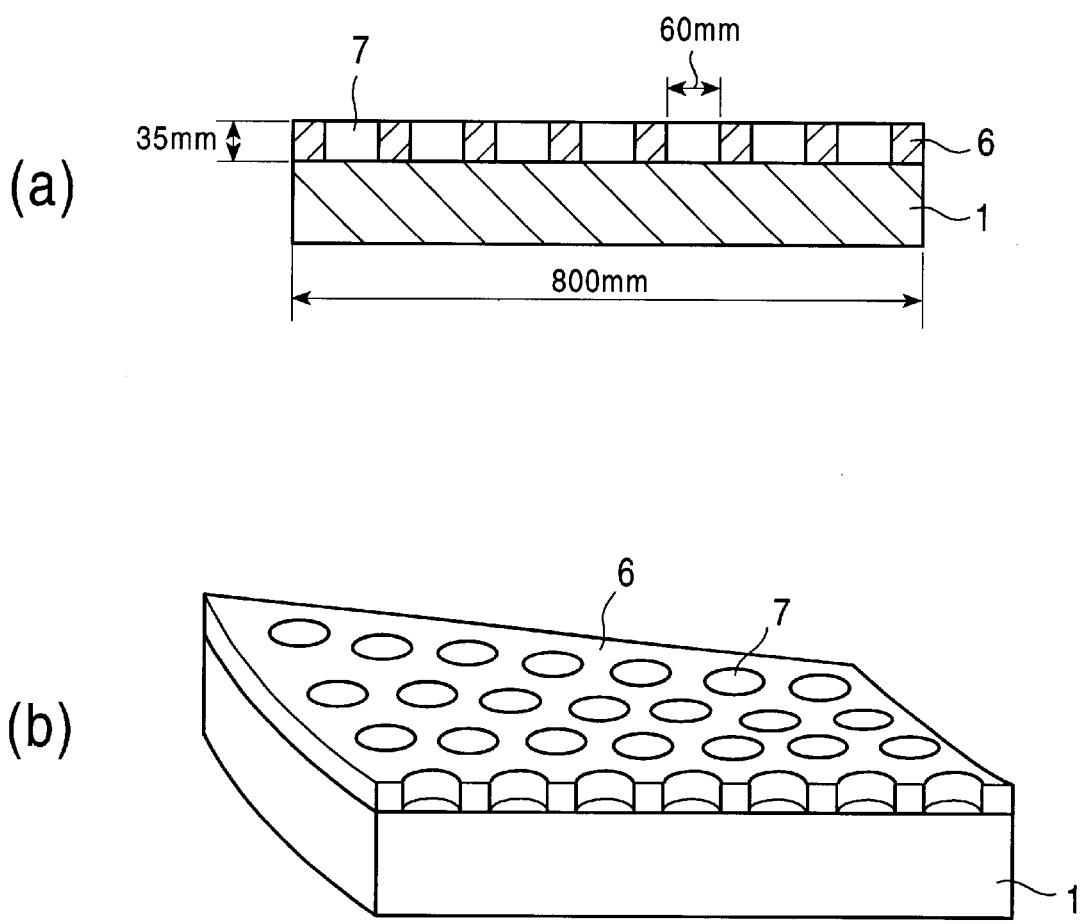
FIG. 23($a$) is a vertical sectional view illustrating the state of feed stock stacking adopted in an embodiment of the invention.

A mixture was reduced by the following procedure using a traveling hearth furnace provided with a traveling hearth lined with alumina refractory, of which the surface was further covered with granular alumina refractory, and having a diameter of 2.2 mm, as shown in FIG. 20, to investigate the presence or absence of a damage to the refractory and the iron recovery ratio.

Figure 15:
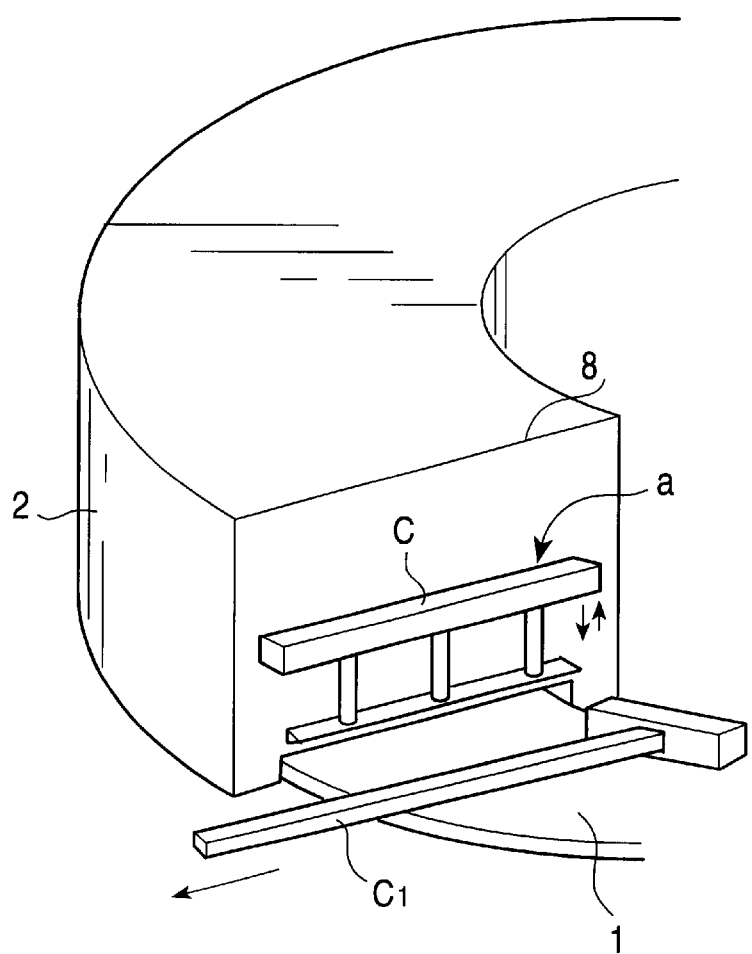
FIG. 15 is a descriptive view of a partial configuration of FIG. 20.
Figure 16:
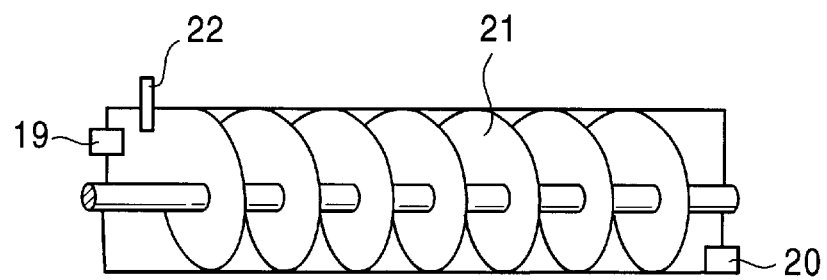
FIG. 16 illustrates a coal char manufacturing apparatus.

In the furnace shown in FIG. 20, a cooler 13 was arranged in the middle between a heating zone (see FIG. 10) and the discharge apparatus to cool the product. As shown in FIG. 15 illustrating a portion of FIG. 20, a crusher 18 comprising a cutter c vertically moving to crush the reduced iron and slag and an arm $c_1$ pulling out the crushed reduced iron and slag was arranged in the discharge apparatus b. Coal char stacked under the mixture was manufactured by the use of a screen feeder type preliminary carbonizing furnace as shown in FIG. 16, provided with a screen feeder 21 between the feed stock charging port 19 and the discharge port 20 and a gas recovery port 22. Waste gas from a traveling hearth furnace has usually a temperature of about 1,150° C. In this example, the preliminary carbonization furnace was heated by the use of waste gas from the traveling hearth furnace.

Figure 17:
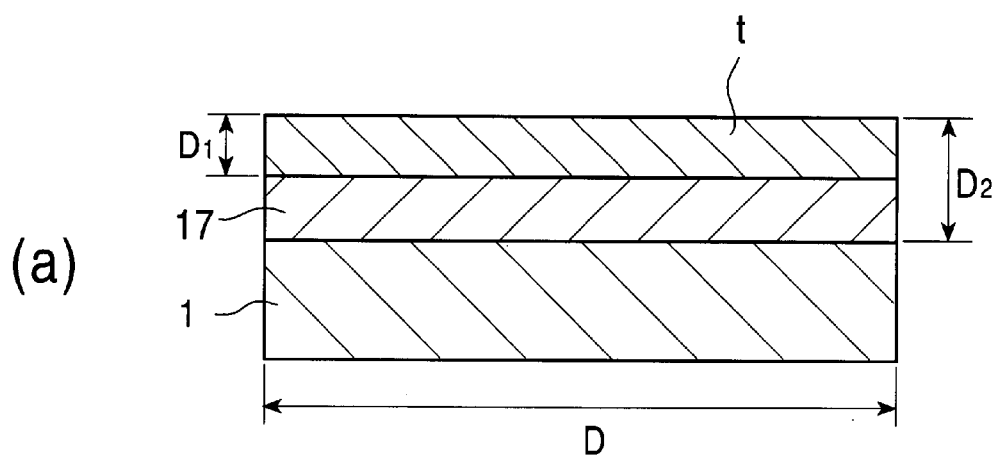
FIG. 17($a$) is a sectional view illustrating a mixed layer and a coal char layer used in an embodiment.
Figure 17:
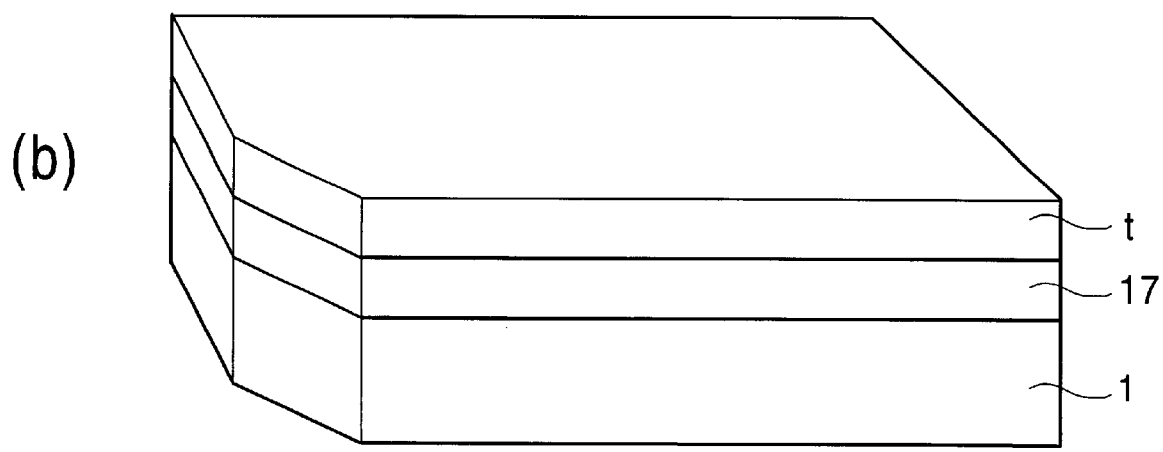
Figure 18:
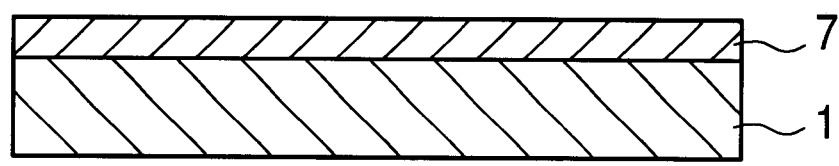
FIG. 18($a$) is a descriptive view illustrating a case where a mixed powder of an iron ore and a solid reducing material is stacked directly on a traveling hearth.
Figure 18:
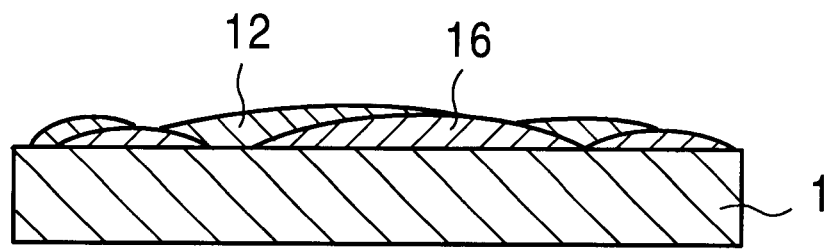

As shown in the sectional view and the perspective view illustrated in FIGS. 17(a) and 17(b), the mixture and the coal char to be subjected to reduction were stacked with D=800 mm, $D_1$=25 mm and $D_2$=40 mm. The fine iron ore and the fine solid reducing material used for the mixture were adjusted to a screen mesh of under 3 mm. The coal char stacked on the hearth was adjusted to under 3 mm. The furnace temperature in the reduction zone was controlled to 1,300° C. through combustion control of the burner. The fuel was mainly composed of CO gas produced from the fine solid reducing material, and natural gas was employed as an auxiliary fuel. The staying time in the furnace was controlled to 27 minutes as a target by means of the rotation speed of the hearth.

Composition of the ore used in the experiment (containing more than 7% gangue such as $SiO_2$ and $Al_2O_3$) is shown in Table 3, and composition of the fine solid reducing material (ash: about 6 to 11%), in Table 4. In this example, limestone was used as an additive. Experimental conditions are shown in Table 5, and the results of the experiment, in Table 6. In the column of mixed powder in Table 5, the fine solid reducing material, the ore, and the additives total 100%. The term "gangue+ash" is expressed by the weight percentage relative to the mixed powder, and include gangue in the ore, ash in the solid reducing agent, and CaO in the additive (limestone).

The run Nos. 17 to 19 represent examples of the invention in which a fine coal char made from a fine coal through preliminary carbonization was used as the fine solid reducing material. In the run Nos. 17 to 19, there was no damage to the refractory of any hearth, and the reduced iron after removal of gangue and ash could be collected. The run Nos. 20 and 21 represent cases according to the invention in which the combustible gas produced in the preliminary carbonization furnace was further collected and used for heating the high-temperature portion of the rotary hearth furnace. In the run Nos. 20 and 21, these was no damage to the refractory of any hearth, and the reduced iron after removal of gangue and ash could be collected. In this example, waste gas from the rotary hearth furnace was used for heating the coal in the preliminary carbonization furnace, and combustible gas produced in the preliminary carbonization furnace was used for heating the high-temperature of the rotary hearth furnace. The combustible gas from the preliminary carbonization furnace has a high calorific value, and could be used for heating the high-temperature portion of the rotary hearth furnace. Particularly in the run Nos. 20 and 21, as compared with the run Nos. 17 to 19, the consumption of natural gas used as an auxiliary fuel could be reduced, and the possibility to further reduce the heat input per ton reduced iron was confirmed.

Run Nos. 22 and 23 represent cases where a fine coal not subjected to preliminary carbonization was employed as the fine solid reducing agent. In these cases, the reduced iron and ash were melted for removing gangue and ash. Cracks occurred in the layer upon carbonization of a portion of fine coal on the rotary hearth. Molten slag and hot metal leaking from this portion were partially mixed directly with granular alumina refractory on the rotary hearth. Slag and reduced iron could be collected by taking out slag, reduced iron and granular alumina refractory mixed therewith to outside the furnace. Separation of granular alumina refractory from slag and reduced iron required operations outside the furnace. In Table 6, as compared with cases using preliminary carbonization of coal, the run Nos. 22 and 23 required a larger consumption of the auxiliary fuel with a view to keeping a constant temperature in the furnace because a decomposition of coal occurs upon reduction. When using the fine coal as the layer of fine solid reducing material alone, a longer period of time is required until reaching the temperature at which the iron ore is reduced than in the case of preliminary carbonization of coal. In order to obtain an iron recovery ratio of the same order as in the case with preliminary carbonization of coal, therefore, it is necessary to use a longer staying time of iron ore in the furnace, resulting in a disadvantage in terms of productivity.

Example 3

The following test operation was carried out by using a rotary hearth furnace shown in FIG. 20 having a rotary hearth having a diameter of 2.2 m and a burner provided above the hearth, these components as a whole being covered with a furnace body. In FIG. 20, 1 is a rotary hearth lined with alumina refractory on the upper surface; b is a screw type discharge apparatus; a is a charger (feed stock stowing position onto the hearth); 2 is a furnace body; 3 is a burner; and 13 is a cooler provided in front of the discharge port for cooling and removing the reduced iron. The feed stock at the supply port were stacked on the rotary hearth under any of the four kinds of conditions as shown in the descriptive view of the feed stock stacking method in FIGS. 21 to 24 by means of the charger a: feed stock included a fine iron ore, a fine additive and a fine solid reducing material. In FIGS. 21 to 24, 7 is a mixed powder of the fine iron ore, the fine additives and the fine solid reducing material; 6 is the fine solid reducing material; and 1 is the rotary hearth.

The fine iron ore containing more than 7% gangue (such as $SiO_2$ and $Al_2O_3$) having the composition shown in Table 3 was used, with limestone as the fine additive. Fine solid reducing material containing ash within a range of from 6 to 13% and having four kinds of composition shown in Table 7, respectively, were used. These materials were used after adjustment to a mesh size of under 3 mm. The experimental conditions and operating results are comprehensively shown in Table 8. In the line of mixed powder in Table 8, the term "gangue+ash" means the content thereof in the mixed powder, and includes gangue in the fine iron ore, ash in the fine solid reducing material, and CaO in the fine additive (limestone).

In Table 8, experiment Nos. 24 to 33 are examples of the invention. Under any of the conditions, there was no damage to the refractory of the hearth, with no trouble in product discharge. A reduced iron after removal of gangue and ash could be collected with an iron recovery ratio of higher than 97.4%.

The comparative examples of the experiment Nos. 34 and 35 (condition 3) show, on the other hand, the stacking method: the mixture is stacked so that the mixed powder is in direct contact with the hearth refractory. Reduced iron and ash were melted in this stowing condition for the removing operation of gangue and ash. Slag and hot metal deposited in molten state to the hearth refractory and eroded the refractory. In addition, in the subsequent cooling operation, slag and hot metal adhered as deposited to the hearth refractory, thus making it impossible to discharge the product by the discharge apparatus.

Figure 24:
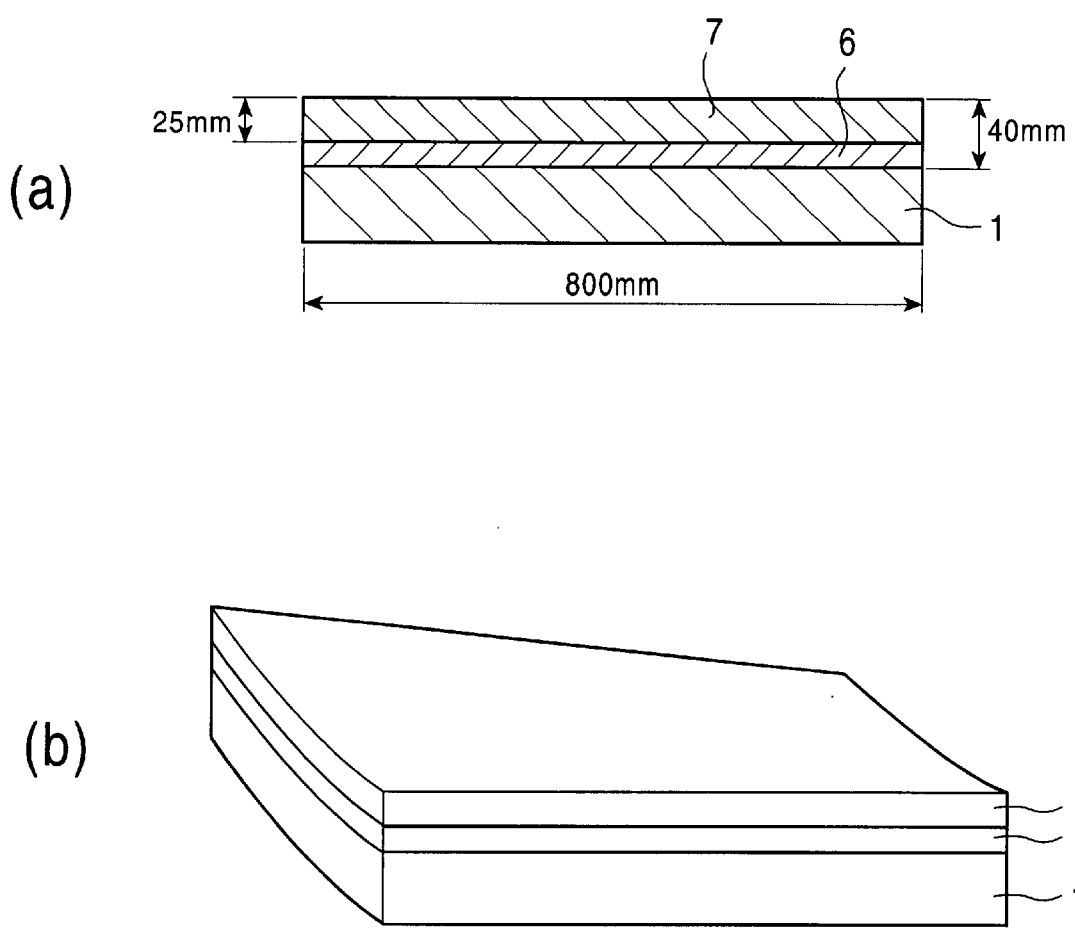
FIG. 24($a$) is a vertical sectional view illustrating the state of feed stock stacking adopted in an embodiment of the invention.

The comparative example of the experiment No. 36 uses the stacking method shown in FIG. 24 (condition 4): the mixed powder was stacked in lamination on the entire upper surface of the layer of the fine solid reducing material alone. In this form of stacking, the reduced iron and ash were melted for removal of gangue and ash. Both slag and hot metal took a shape of a large plate, and the effect of surface tension decreased relative to the weight. At some portions, hot metal and slag penetrated under the layer of the fine solid reducing material, and came into direct contact with the refractory of the hearth. The hot metal and slag thus eroded the refractory at these portions, and as a result of the subsequent operation, the hot metal adhered as it was to the hearth refractory, thus making it impossible to discharge the product by means of the discharge apparatus.

The comparative example of the experiment No. 37 covers the same stacking method as that in the experiment No. 36. In this form of stacking, the reduced iron and ash was melted. The hot metal and slag never penetrated fortunately under the layer of the fine solid reducing material alone as in the experiment No. 35. Apart from partial cracks caused by contraction during the cooling process, slag and reduced iron after cooling formed a large slab, and it was difficult to discharge them.

Figure 25:
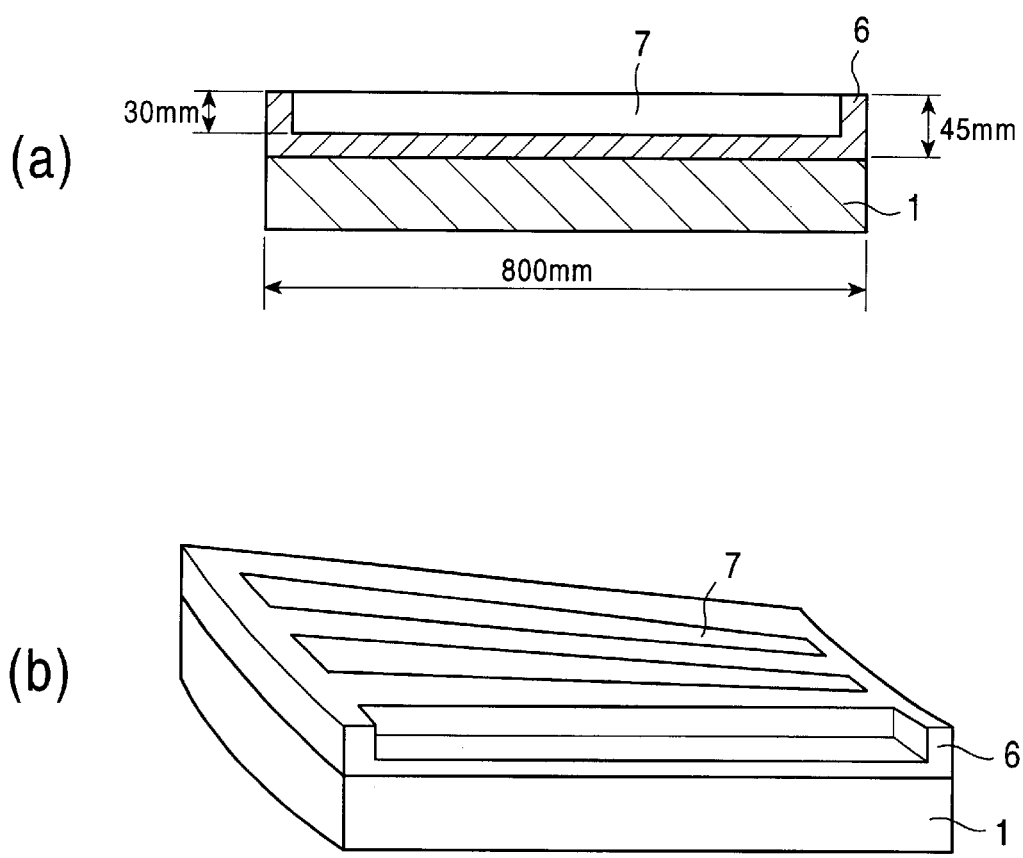
FIG. 25($a$) is a vertical sectional view of the state of stacking in an embodiment of the invention.
Figure 26:
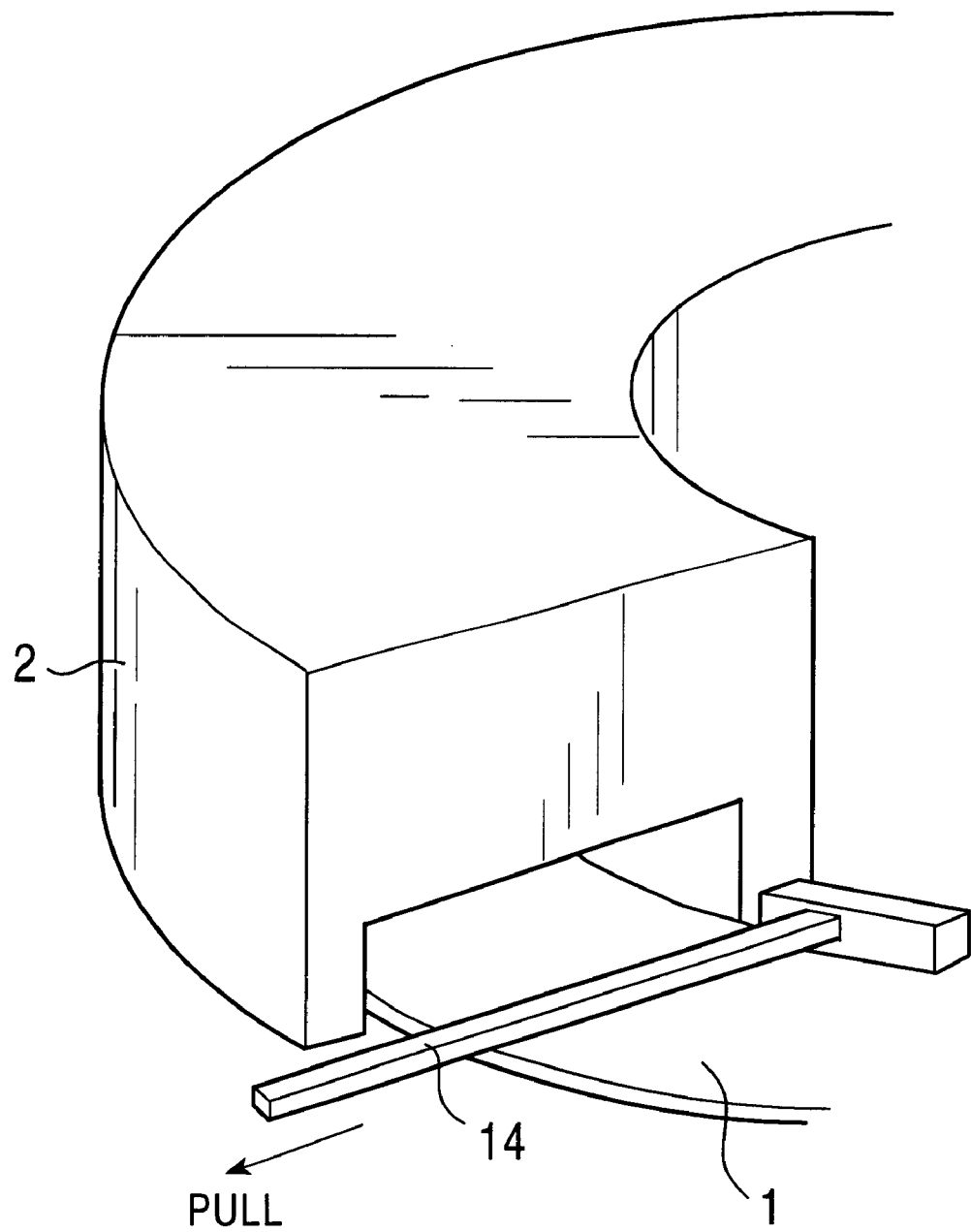
FIG. 26 is a descriptive view of a discharge apparatus used when stowing in an embodiment according to the invention.

As a variant of the invention, there is conceivable a stacking method as shown in FIG. 25. In this case, slag and reduced iron after cooling coming to the discharge port take the form of a bar extending in the radial direction of the rotary hearth. Use of a discharge apparatus having the construction as shown in FIG. 26 is therefore considered appropriate. In FIG. 26, 1 is a rotary hearth; 2 is a furnace body; and 14 is a discharge apparatus used when stacking in the case of the variant.

TABLE 1

|  | t-Fe | $SiO_2$ | $Al_2O_3$ | CaO | MgO | $TiO_2$ | S | (%) P |
|---|---|---|---|---|---|---|---|---|
| Iron ore | 62.3 | 4.31 | 2.6 | 0.04 | 0.05 | 0.1 | 0.014 | 0.075 |

|  | FC | VM | Ash (%) |
|---|---|---|---|
| Coal | 56.8 | 32.8 | 10.2 |
| Char | 82.08 | 2 | 15.46 |
| Coke | 87.7 | 0.9 | 11.2 |

TABLE 2

| Experiment No. | Kind of carbonaceous material | Quantity of carbonaceous material (kg/t) | Presence of lower carbonaceous material layer | Melting zone temp. (°C.) | Heating time (min.) | Layer surface reducing gas concentration (%) | Slag concentration (kg-slag/kg-metal) | Slag separating ratio (%) | Reduced iron yield | Remarks |
|---|---|---|---|---|---|---|---|---|---|---|
| 1 | Coal | 600 | None | 1300 | 6 | 3 | 160.3 | 10 | 92 | Comparative example |
| 2 | Coal | 600 | None | 1400 | 6 | 3 | 160.3 | 10 | 94 | Comparative example |
| 3 | Coal | 600 | None | 1450 | 6 | 3 | 133.6 | 25 | 95 | Comparative example |
| 4 | Coal | 600 | Present | 1480 | 6 | 3 | 71.3 | 60 | 96 | Example of invention |
| 5 | Coal | 600 | Present | 1500 | 6 | 3 | 44.5 | 75 | 95 | Example of invention |
| 6 | Coal | 600 | Present | 1550 | 6 | 3 | 26.7 | 85 | 94 | Example of invention |
| 7 | Coal | 600 | Present | 1600 | 6 | 3 | 14.3 | 92 | 92 | Example of invention |
| 8 | Coal | 600 | Present | 1480 | 4 | 3 | 74.8 | 58 | 97 | Example of invention |
| 9 | Coal | 600 | Present | 1480 | 8 | 3 | 64.1 | 64 | 92 | Example of invention |
| 10 | Coal | 600 | Present | 1480 | 6 | 90 | 42.8 | 76 | 98 | Example of inventio |
| 11 | Coal | 600 | None | 1480 | 6 | 3 | 65.9 | 63 | 82 | Example of invention |
| 12 | Coal | 600 | None | 1480 | 6 | 90 | 57.0 | 68 | 83 | Example of invention |
| 13 | Coke | 415 | Present | 1480 | 6 | 90 | 32.9 | 80 | 96 | Example of invention |
| 14 | Coke | 415 | Present | 1480 | 6 | 3 | 37.9 | 77 | 94 | Example of invention |
| 15 | Char | 389 | Present | 1480 | 6 | 90 | 33.1 | 81 | 98 | Example of invention |
| 16 | Char | 389 | Present | 1480 | 6 | 3 | 41.8 | 76 | 92 | Example of invention |

Layer surface reducing gas concentration = $(CO + H_2)/(CO + H_2 + H_2O + CO_2) \times 100$

TABLE 3

| Crystallized water % | T. Fe % | FeO % | SiO$_2$ % | Al$_2$O$_3$ % | CaO % | MgO % | P % | S % |
|---|---|---|---|---|---|---|---|---|
| 3.25 | 62.30 | 0.11 | 4.31 | 2.60 | 0.04 | 0.05 | 0.075 | 0.014 |

TABLE 4

| | | Volatile matters % | Ash % |
|---|---|---|---|
| A | Coal char | 3.0 | 10.4 |
| B | General coal | 44.5 | 6.6 |

TABLE 5

| | Mixed powder | | | | | Layer of powdery solid reducing agent alone | |
|---|---|---|---|---|---|---|---|
| | Solid reducing agent | | | Additive | Gauge + | | |
| Run No. | A mass % | B mass % | Ore mass % | (limestone) mass % | ash mass % | A mass % | B mass % |
| 17 | 17.7 | | 75.3 | 7.0 | 10.9 | 100 | |
| 18 | 17.4 | | 75.6 | 7.0 | 11.3 | 100 | |
| 19 | 18.8 | | 81.2 | | 7.6 | 100 | |
| 20 | 17.5 | | 75.5 | 7.0 | 10.9 | 100 | |
| 21 | 18.6 | | 81.4 | | 7.6 | 100 | |
| 22 | | 27 | 66 | 7.0 | 10.2 | | 100 |
| 23 | | 29.1 | 70.9 | | 6.9 | | 100 |

TABLE 6

| Run No. | | Damage to hearth refractory | Product reduced iron | | | | Staying period in rotary hearth furnace min |
|---|---|---|---|---|---|---|---|
| | | | Iron recovery yield mass % | Gangue mass % | Production kg-DRI/hour | Heat input Gcal/t-DRI | |
| 17 | Example of invention | None | 98.5 | 0.1 | 127 | 5.57 | 27 |
| 18 | Example of invention | None | 98.1 | 0.1 | 125 | 5.54 | 27 |
| 19 | Example of invention | None | 97.8 | 0.2 | 130 | 5.60 | 27 |
| 20 | Example of invention | None | 98.8 | 0.1 | 123 | 5.10 | 27 |
| 21 | Example of invention | None | 97.4 | 0.2 | 129 | 5.08 | 27 |
| 22 | Comparative example | Present | 96.6 | 0.2 | 107 | 6.55 | 32 |
| 23 | Comparative example | Present | 95.9 | 0.2 | 104 | 6.62 | 32 |

TABLE 7

(%)

| Symbol | Material | Volatile matters | Ash |
|---|---|---|---|
| A | Coke | 1.0 | 12.0 |
| B | General coal | 44.5 | 6.6 |
| C | Coal char | 3.0 | 10.4 |
| D | Anthracite | 3.6 | 7.5 |

TABLE 8

| Experiment No. | Mixed powder | | | | | | | Layer of powdery solid reducing agent alone | | | |
|---|---|---|---|---|---|---|---|---|---|---|---|
| | Solid reducing agent | | | | Ore mass % | Additive (limestone) mass % | Gangue + ash mass % | | | | |
| | A mass % | B mass % | C mass % | D mass % | | | | A mass % | B mass % | C mass % | D mass % |
| 24 | 17.4 | | | | 75.6 | 7.0 | 11.3 | | | | 100 |
| 25 | | 27.1 | | | 65.9 | 7.0 | 10.3 | | 100 | | |
| 26 | | | 17.5 | | 75.5 | 7.0 | 11.0 | | | 100 | |
| 27 | | | | 17.1 | 75.9 | 7.0 | 10.5 | | 50 | 50 | |
| 28 | 11.1 | 9.8 | | | 72.1 | 7.0 | 10.9 | 100 | | | |
| 29 | | 12.0 | 9.7 | | 71.3 | 7.0 | 10.7 | 50 | | | 50 |
| 30 | | | 9.0 | 9.6 | 81.4 | | 7.4 | 25 | 25 | 50 | |
| 31 | 5.0 | 5.0 | 10.6 | | 79.4 | | 7.7 | | 25 | 25 | 50 |
| 32 | | 5.0 | 5.0 | 9.1 | 73.9 | 7.0 | 10.6 | 25 | 25 | 25 | 25 |
| 33 | 5.0 | 5.0 | 5.0 | 4.2 | 73.8 | 7.0 | 10.8 | | 100 | | |
| 34 | 17.4 | | | | 75.6 | 7.0 | 11.3 | | | | |
| 35 | | 29.1 | | | 70.9 | | 6.9 | | | | |
| 36 | | | 17.5 | | 75.5 | 7.0 | 11.0 | | 50 | 50 | |
| 37 | | | | 18.4 | 81.6 | | 7.2 | 100 | | | |

| Experiment No. | Stowing condition | Damage to hearth refractory | Trouble in product discharge | Product reduced iron | | Remarks |
|---|---|---|---|---|---|---|
| | | | | Iron recovery yield % | Gangue % | |
| 24 | 1 | None | None | 98.0 | 0.1 | Example of invention |

TABLE 8-continued

| | | | | | | |
|---|---|---|---|---|---|---|
| 25 | 1 | None | None | 97.8 | 0.2 | Example of invention |
| 26 | 2 | None | None | 98.8 | 0.1 | Example of invention |
| 27 | 2 | None | None | 98.5 | 0.1 | Example of invention |
| 28 | 2 | None | None | 97.7 | 0.2 | Exanple of invention |
| 29 | 2 | None | None | 98.2 | <0.1 | Example of invention |
| 30 | 1 | None | None | 97.6 | <0.1 | Example of invention |
| 31 | 1 | None | None | 98.7 | 0.2 | Example of invention |
| 32 | 1 | None | None | 97.4 | 0.3 | Example invention |
| 33 | 1 | None | None | 99.0 | 0.1 | Example of invention |
| 34 | 3 | Present | Present | — | — | Comparative example |
| 35 | 3 | Present | Present | — | — | Comparative example |
| 36 | 4 | None | Present | — | — | Comparative example |
| 37 | 4 | None | Present | — | — | Comparative example |

Industrial Applicability

According to the present invention, it is possible to efficiently separate slag from reduced iron in a traveling hearth furnace. It is therefore possible to reduce the lime consumption and electric power consumption in the subsequent electric furnace. At the same time, there is available an advantage of using inexpensive ore and coal with high contents of gangue and ash, which are most abundantly available.

In the present invention, furthermore, use of coal char as a carbonaceous material permits further improvement of productivity, and use of carbonized gas generated upon manufacturing a char as a fuel permits saving of energy consumption.

Further, the present invention proposes a process comprising the steps of dividing a mixed powder containing a fine iron ore and a fine solid reducing material into small blocks, dotting the hearth surface with these blocks and melting the reduced iron on the hearth so as not to be in direct contact with the hearth because of the presence of the fine solid reducing material, in the reduction of iron ore in a traveling hearth furnace. According to the invention, therefore, it is possible to obtain a reduced iron that is free from gangue or ash without causing damage to the facilities while using a simple equipment and while ensuring a smooth operation.

What is claimed is:

1. A method of operating a traveling hearth furnace, comprising:
   stacking a layer comprising a mixture of fine iron ore and a fine solid reducing material onto a hearth traveling horizontally therewith while transferring said layer along a course in said furnace,
   subjecting said layer to a reduction reaction via radiant heat transfer from the upper portion of the hearth,
   melting reduced iron from said reduction reaction,
   subjecting said reduced iron to separation of slag from said reduced iron by melting said reduced iron to reduce viscosity of said slag, causing separation of said slag from said reduced iron by aggregation and displacement, thus converting said reduced iron into separate bodies comprising said reduced iron and said slag,
   solidifying said reduced iron, and
   discharging said reduced iron from the furnace.

2. A method according to claim 1, wherein said traveling hearth is a rotary hearth.

3. A method according to claim 1 or 2, wherein said method comprises generating an oxygen partial pressure of a gaseous phase over said reduction product into a reducing atmosphere.

4. A method according to claim 1 or 2, wherein a layer different from the mixture layer is layered on between said hearth and said mixture layer.

5. A method according to claim 4, wherein said layer different from said mixture layer is a layer of a carbonaceous material.

6. A method according to claim 5, wherein, prior to positioning said mixture layer onto said hearth, fine coal char is first placed on said hearth, wherein the said mixture layer is layered upon said layer consisting of the said fine coal char, and wherein the product resulting from reduction of the resulting mixture is melted on said hearth at least once.

7. A method according to claim 6, wherein a carbonized gas is produced upon manufacturing the fine coal char by preliminary carbonization of coal, and wherein said carbonized gas is used as a heating fuel.

8. A method according to claim 5, wherein said method comprises the steps of dividing a mixed powder of a fine iron ore and a fine solid reducing material or a mixed powder of a fine ore, fine additives and a fine solid reducing material into small blocks, dotting the hearth surface with said small blocks on said fine solid reduction material so as to avoid direct contact of said blocks with said hearth, and melting the reduced iron on said hearth at least once.

9. A method according to claim 8, wherein said fine solid reducing material is one or a mixed powder of two or more materials selected from the group consisting of coal char, coke, general coal and anthracite.

10. A traveling hearth furnace, comprising:
    a hearth for conducting preheating and reduction of a layer comprising a mixture of fine iron ore and a fine solid reducing material stacked thereon while transferring said layer along a course in said furnace, and a furnace body surrounding said hearth and provided with one or more burners at the top of the inside thereof;

wherein said hearth furnace has a distinct melting zone comprising physical partitioning to create a melting chamber separate from a preheating zone and a reduction zone, wherein said physical partitioning allows free movement of said hearth, and wherein a reduced iron is melted in said melting chamber to provide means to separate therefrom slag contained therein by reducing viscosity of said slag, and means for causing separation of said slag from said reduced iron by aggregation and displacement, and the product is led to a discharge port for discharging said product.

11. A traveling hearth furnace according to claim 10, wherein said traveling hearth is a rotary hearth.

12. The method defined in claim 1, wherein said continuous layer of finely divided carbonaceous material has a particle size below 10 mm.

13. The method defined in claim 1, wherein said layer of iron oxide has a particle size of under 8 mm.

\* \* \* \* \*